United States Patent [19]
Suzuki

[11] Patent Number: 5,173,847
[45] Date of Patent: Dec. 22, 1992

[54] PWM POWER SUPPLY WITH SYNCHRONOUS RECTIFIER AND SYNCHRONIZING OSCILLATOR

[75] Inventor: Koji Suzuki, Yokohama, Japan

[73] Assignee: Canon Kabushiki Kaisha, Tokyo, Japan

[21] Appl. No.: 414,274

[22] Filed: Sep. 29, 1989

[30] Foreign Application Priority Data

| Sep. 30, 1988 | [JP] | Japan | 63-244244 |
| Sep. 30, 1988 | [JP] | Japan | 63-244245 |
| Sep. 30, 1988 | [JP] | Japan | 63-244246 |
| Sep. 30, 1988 | [JP] | Japan | 63-244247 |
| Sep. 30, 1988 | [JP] | Japan | 63-244248 |

[51] Int. Cl.$^5$ ........................... H02M 3/335
[52] U.S. Cl. ........................... 363/21; 363/80; 363/89
[58] Field of Search ............ 363/21, 80 X, 81, 84, 363/89 X

[56] References Cited

U.S. PATENT DOCUMENTS

| 4,466,051 | 8/1984 | Fitzgerald | 363/21 |
| 4,524,411 | 6/1985 | Willis | 363/21 |
| 4,581,690 | 4/1986 | Russell | 363/80 |
| 4,659,894 | 4/1987 | Inoue | 363/21 |
| 4,727,463 | 2/1988 | Suzuki | 353/21 |
| 4,731,720 | 3/1988 | Takahashi | 363/21 |
| 4,739,461 | 4/1988 | Komatsu et al. | 363/20 |
| 4,740,879 | 4/1988 | Peruth | 363/21 |
| 4,791,528 | 12/1988 | Suzuki et al. | 361/235 |
| 4,868,729 | 9/1989 | Suzuki | 363/21 |
| 4,891,572 | 1/1990 | Suzuki | 323/284 |
| 4,945,255 | 7/1990 | Suzuki et al. | 307/17 |
| 4,980,811 | 12/1990 | Suzuji et al. | 363/21 |

*Primary Examiner*—Steven L. Stephan
*Assistant Examiner*—Jeffrey Sterrett
*Attorney, Agent, or Firm*—Fitzpatrick, Cella, Harper & Scinto

[57] ABSTRACT

There is disclosed a power supply device having a transformer including primary and secondary windings, for generating in said secondary winding a high voltage output corresponding to power supplied to said primary winding, a first switch for on-off switching power supplied to the primary winding of said transformer, a first signal generator for supplying a switching signal at a first frequency to said first switch, a rectifier for rectifying the high voltage output generated in the secondary winding of said transformer, and controller including a second signal generator for supplying a modulating signal at a second frequency lower than said first frequency, for modulating the output of said rectifier by means of controlling the power supplied to the primary winding of said transformer in accordance with said modulating signal.

28 Claims, 35 Drawing Sheets

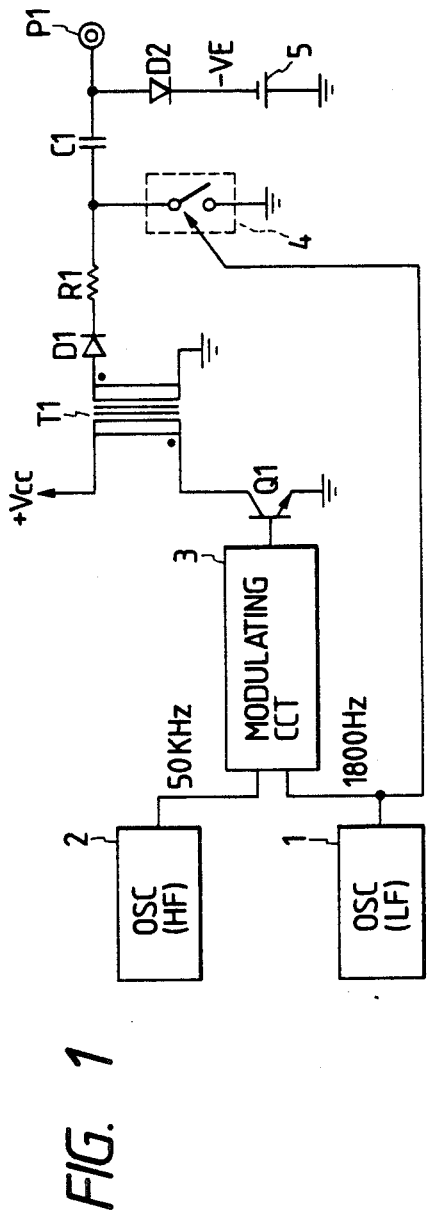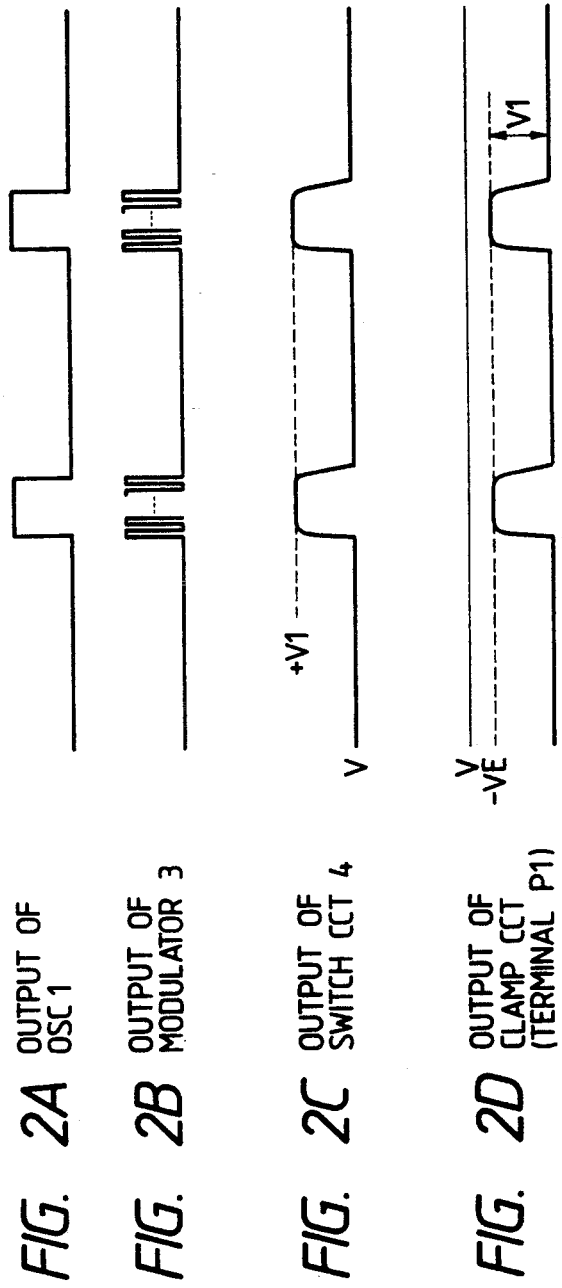

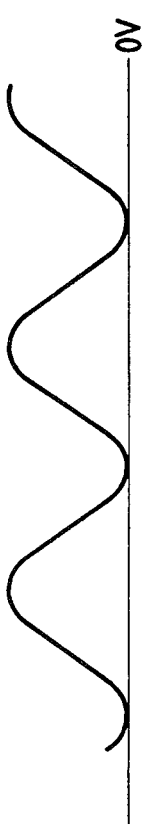
FIG. 19A  OUTPUT OF SINE WAVE OSC 51
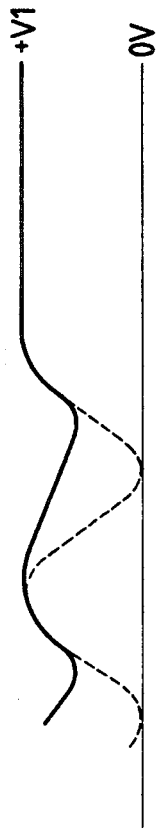
FIG. 19B  OUTPUT OF SWITCH CCT Q52
FIG. 19C  OUTPUT OF PWM CCT 55
FIG. 19D  OUTPUT OF PWM CCT 54
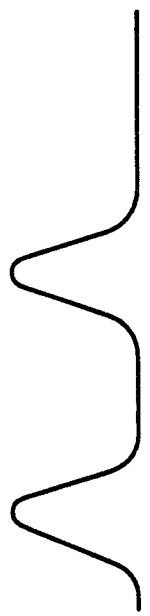
FIG. 19E  OUTPUT OF ERROR AMP 53
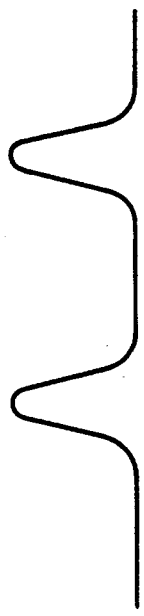
FIG. 19F  OUTPUT OF ERROR AMP 52

FIG. 30A
FIG. 30B
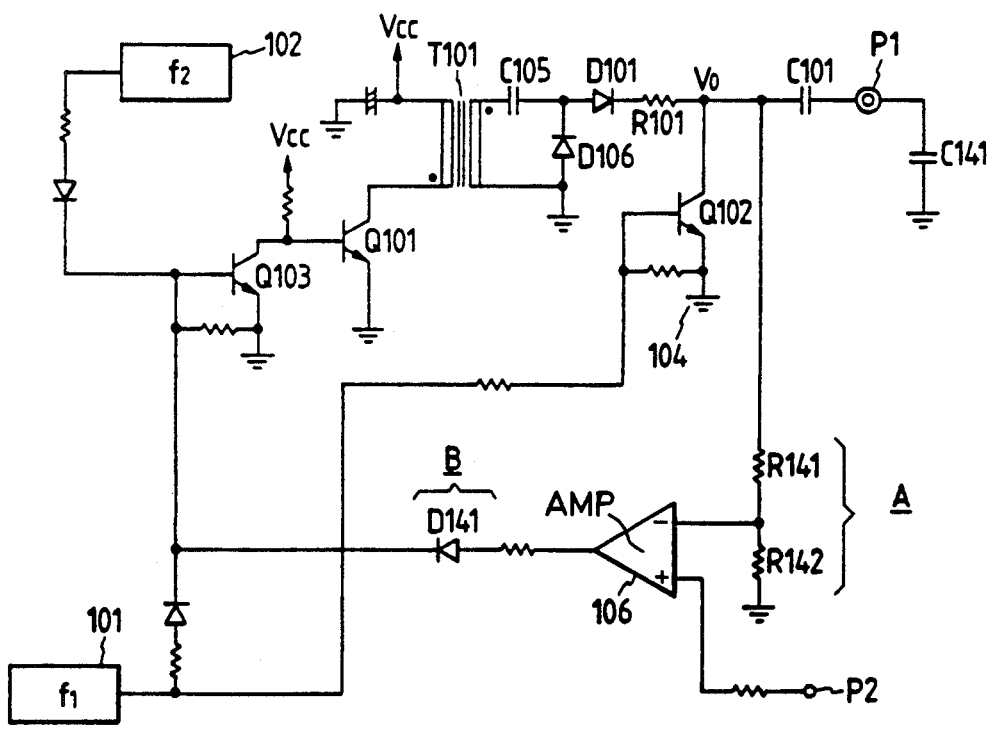
FIG. 31

PWM POWER SUPPLY WITH SYNCHRONOUS RECTIFIER AND SYNCHRONIZING OSCILLATOR

BACKGROUND OF THE INVENTION

1. Field of the Invention

This invention relates to a power supply device and, more particularly, to a power supply device which can be used suitably for electro-photographic copiers, printers and so forth.

2. Related Background Art

Various image-forming apparatuses such as electro-photographic copiers and printers are well known in the art. These apparatuses require a high DC or AC or superimposed AC-DC voltage for a charging step, a developing step and so forth. Particularly, a high superimposed AC-DC voltage is provided as developing bias to a developing unit. A usual power supply for providing a developing bias comprises a low frequency AC output step-up transformer and a DC/DC inverter coupled to the transformer for superimposing a DC voltage on the AC output.

In the prior art power source of this kind, however, the low frequency AC output step-up transformer for generating an AC component of the developing bias is large in size. In addition, the frequency of the AC component of the bias is in the audible frequency range, and therefore considerable noise is generated. It is very difficult to reduce this noise. Further, the duty ratio of the transformer can not be varied greatly from 50% due to unbalanced excitation of the transformer.

It is proposed to modulate a primary side input to the DC/DC inverter according to a low frequency signal to thereby modulate a secondary side rectified output of the inverter, thus obtaining a high voltage, in which a modulation component is superimposed on a DC component (as disclosed in U.S. Pat. Nos. 4,731,720 and 4,727,463).

In this case, however, if a pulse wave is used as the low frequency signal, the response of the falling of the secondary side output to the falling of the pulse wave is dull, and it is impossible to obtain an adequate output.

SUMMARY OF THE INVENTION

The present invention has been intended in the light of the above, and its primary object is to provide an improved power supply device.

Another object of the invention is to provide a power supply device, which is small in size and permits cost reduction.

A further object of the invention is to provide a power supply device, which permits elimination of audible frequency noise.

A still further object of the invention is to provide a power supply device, which permits variation of the duty ratio.

A yet further object of the invention is to provide a power supply device, which has improved modulation output falling characteristics.

A still another object of the invention is to provide a power supply device, which can stabilize modulation output with high accuracy.

A yet another object of the invention is to provide a power supply device, which can suppress modulation output overshoot and reduce high frequency ripple.

The above and other objects, features and advantages of the invention will become more apparent from the following description and drawings.

BRIEF DESCRIPTION OF THE DRAWINGS

FIG. 1 is a diagram showing a power supply device adopting the invention;

FIGS. 2A to 2D are waveform charts showing voltage waveforms appearing in various parts of the device shown in FIG. 1.

FIG. 3 and the following Figures illustrate modifications of the basic construction according to the invention shown in FIG. 1, and in which:

FIG. 3 is a diagram showing an instance of output amplitude stabilization through PWM control of a converter transformer primary side;

FIGS. 19A to 19F are waveform charts showing voltage waveforms appearing in various parts of the construction shown in FIG. 18;

FIG. 26 is a diagram showing a further embodiment, in which load current is detected using a pulse transformer;

FIGS. 30A and 30B are waveform charts showing output of the circuit of FIG. 1;

FIG. 31 is a diagram showing a further embodiment, which is adapted to cut off the power supply to the primary side upon reaching a predetermined level of output;

DETAILED DESCRIPTION OF THE PREFERRED EMBODIMENTS

Figure 3:
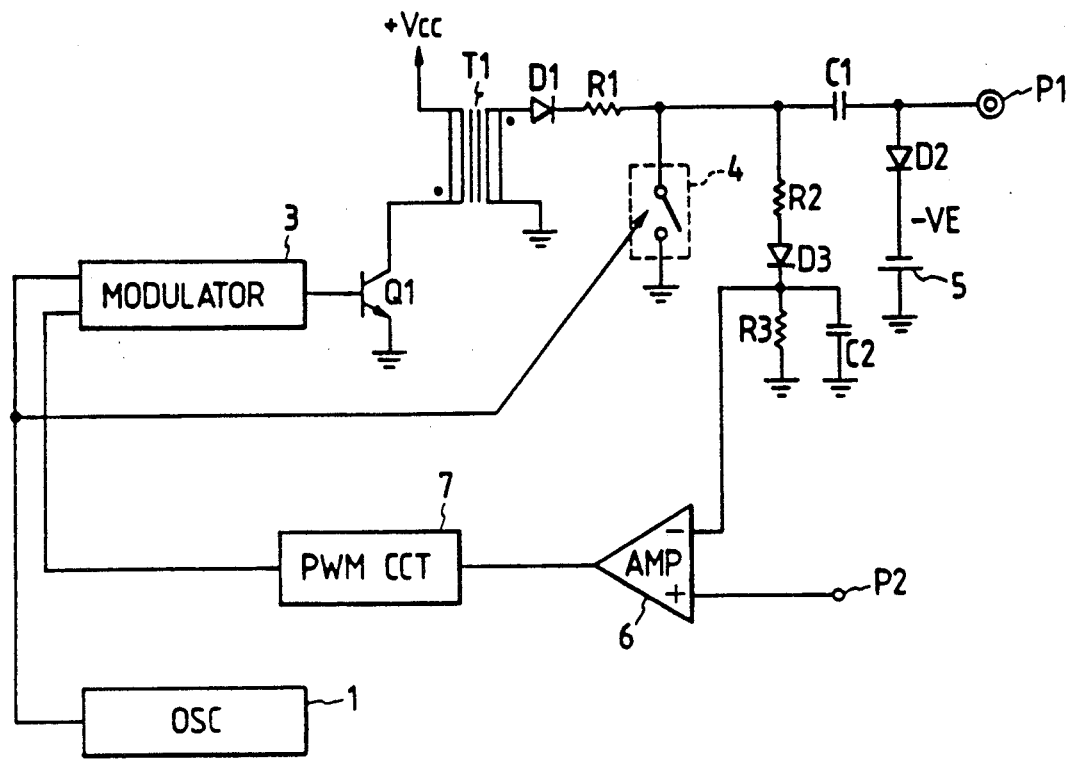

Now, the invention will be described in detail in conjunction with embodiments thereof illustrated in the drawings.

FIG. 1 shows the circuit construction of a power supply device according to the invention, and FIG. 2 shows waveforms of signals appearing in various parts of the circuit of FIG. 1.

Reference numerals 1 and 2 in FIG. 1 designate oscillators for generating pulse voltages. More specifically, the (L,F) oscillator 1 generates a pulse signal at a frequency of 1,800 Hz and having a duty ratio of 20% (A in FIG. 2), and the (HF) oscillator 2 generates a pulse signal at a frequency of 50 kHz and having a duty ratio of 50% (B in FIG. 2).

The output of the (HF) oscillator 2 is supplied to a modulating circuit 3 for substantially 100% amplitude modulation according to the output signal of the (LF) oscilaltor 1. The application of a voltage of +Vcc from a low voltage power supply through transistor Q1 to the primary winding of step-up transformer T1 is controlled according to the output signal of the modulating circuit 3.

To the secondary side of step-up transformer T1 is connected a clamping circuit for DC component superimposition, which includes capacitor C1, diode D2 and power supply 5, through discharge resistor R1 and rectifying diode D1. The output of the clamping circuit is provided from terminal P1. The connection point between resistor R1 and clamping capacitor C1 can be grounded by switch 4, which may be a relay, an analog switch or the like. Step-up transformer T1 and rectifying diode D1 are connected to each other in a flyback system as shown.

Switch 4 is turned on in synchronism to the provision of a low level output of oscillator 1, i.e., the turning-off of the transistor Q1 and the step-up transformer T1 as shown in C in FIG. 2.

While transistor Q1 is being driven at 50 kHz, a voltage of V1 is obtained at the cathode of clamping diode D1 and smoothed by clamping capacitor C1. Thus, the output of switch 4 is as shown in C in FIG. 2. The output obtained is coupled by capacitor C1 to output terminal P1. However, since diode D2 is turned on at the time of a positive peak to clamp the output to the level of DC power supply 5 providing an output voltage of −VE, an output with an amplitude of V1 and a positive peak value of −VE can be obtained at terminal P1.

This output, as shown in D in FIG. 2, is a result of the superimposition of a negative DC voltage of −VE and an AC pulse wave of V1 at 1,800 Hz on each other, and it can be used as the developing bias of an electrophotographic system.

With the above arrangement, transformer T1 is driven by high frequency driving, and unlike the prior art there is no need of using a large size transformer capable of low frequency driving. Thus, the power supply unit may be reduced in size and weight. In addition, noise problems can be readily dealt with.

While FIGS. 1 and 2 have concerned with the most basic arrangement, various modifications are possible as shown in following Figures from FIG. 3. In the following Figures from FIG. 3, parts like those in the above embodiment are designated by like reference numerals while they are not described any further.

The instance of FIG. 1 lacks output stabilization means. In the instance of FIG. 3, a PWM (pulse modulation circuit) 7 is provided in lieu of a high frequency oscillator 2 for stabilization of the amplitude of the AC component of the output to a predetermined value. PWM circuit 7 provides an AC signal (i.e., pulse signal) at around 90 kHz, which is the oscillation frequency of the oscillator 2 in FIG. 1.

In the instance of FIG. 3, the output voltage (V1) of switch 4 is divided, rectified and smoothed by resistors R2 and R3 and diodes D3 and D2, and the resultant voltage is supplied to error amplifier 6 for comparison with a reference voltage, which corresponds to a predetermined output amplitude and is supplied from the outside to terminal P2, thereby controlling the pulse width of the pulse output of PWM circuit 7.

With this arrangement, it is possible to control the duty ratio of driving of step-up transformer T1 to obtain a constant AC component amplitude. The other arrangement is the same as in the instance of FIG. 1.

Figure 4:
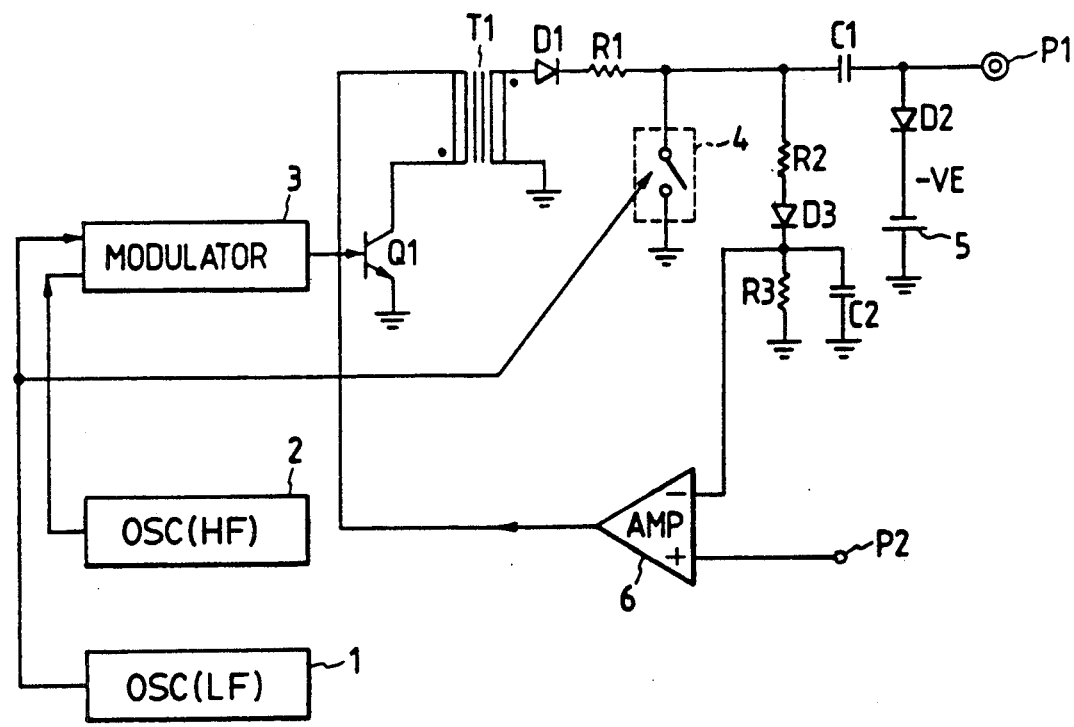
FIG. 4 is a diagram showing an instance of output amplitude stabilization through series control of the converter transformer primary side.

In the instance of FIG. 4, like the instance of FIG. 3, the output amplitude is stabilized to a predetermined value. In this case, however, no PWM circuit is used. Instead, the supply voltage of step-up transformer T1 is controlled by using the output voltage of error amplifier 6 as input voltage to transformer T1. This arrangement can again control the AC component amplitude. The other arrangement is the same as in the case of FIG. 3. In this instance, the output terminal of error amplifier 6 is connected directly to the step-up transformer. However, it is possible to insert a voltage amplifier, a level shifter or any other circuit between the two points noted above.

Figure 5:
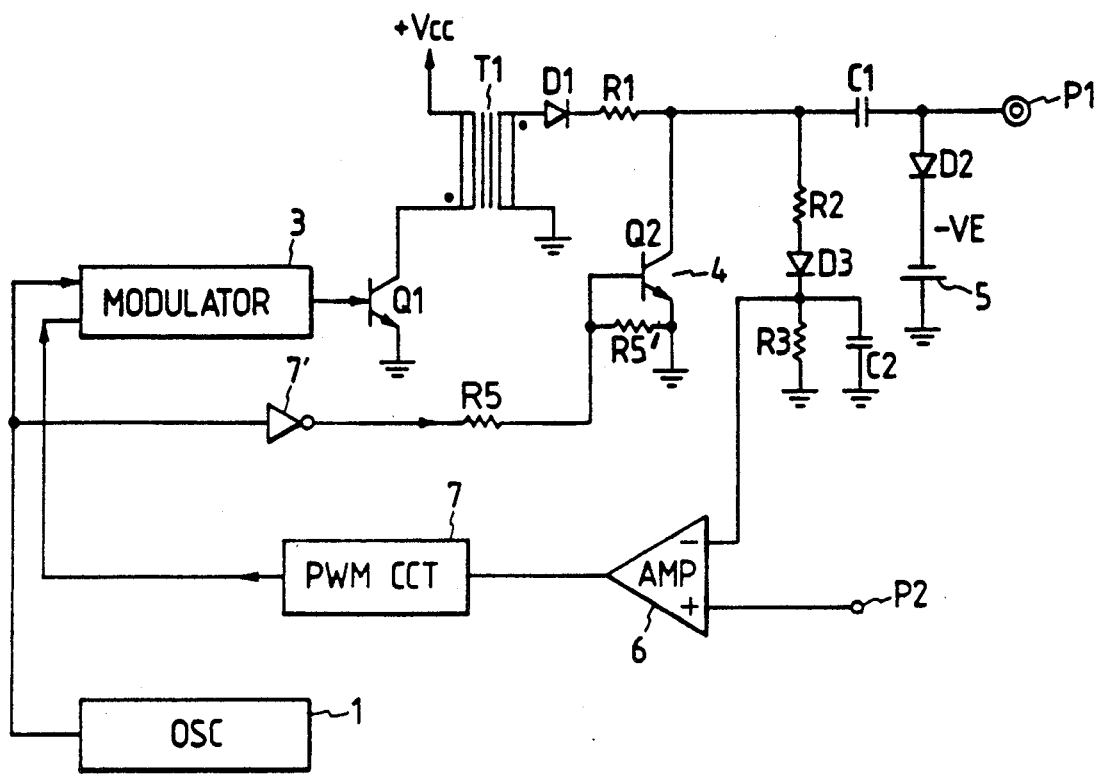
FIG. 5 is a diagram showing an example of the switch shown in FIG. 1.

In the instance of FIG. 5, switch 4 uses a high breakdown voltage transistor Q2. Bias resistors R5 and R5' are connected to the base of transistor Q2. The output of the (LF) oscillator 1 is coupled through inverter 7' to a bias circuit constituted by resistors R5 and R5'. While in this instance a transistor is used for switch 4, a high breakdown FET may be used as well in the same circuit construction. The other arrangement is the same as in the case of FIG. 3.

Figure 6:
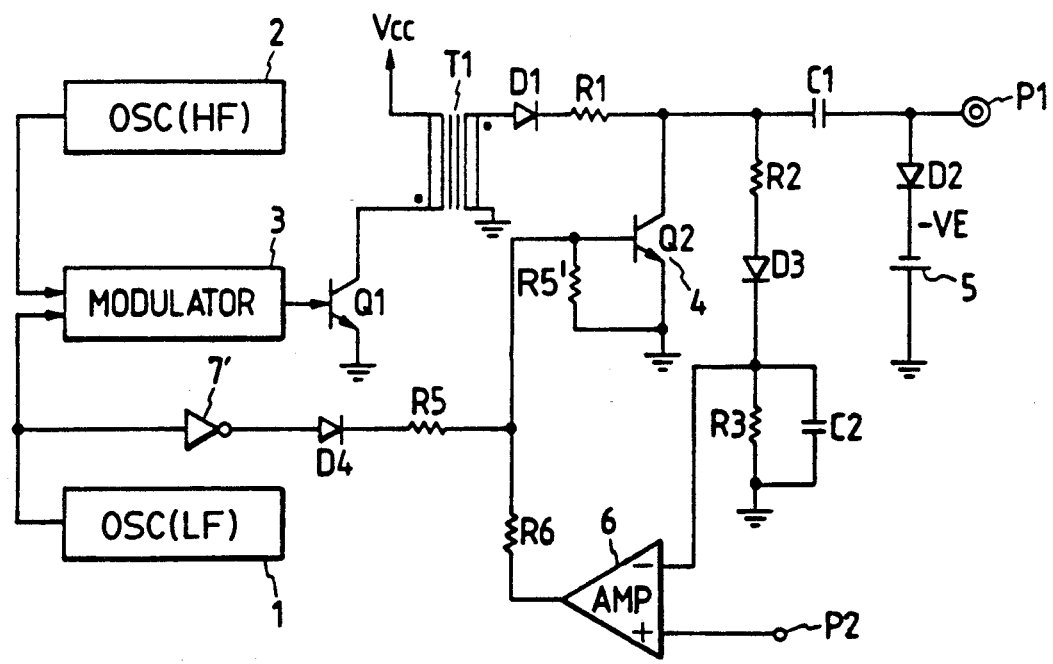
FIG. 6 is a diagram showing an instance of output amplitude stabilization through high breakdown voltage transistor base current control.

In the instance of FIG. 6, unlike the instance of FIG. 5, the base current in transistor Q2 of switch 4 is controlled to stabilize of the output amplitude to a predetermined value.

In this instance, the output of error amplifier 6 is coupled through resistor R6 to the base of transistor Q2, while the output of inverter 7' is coupled through diode D4 and resistor R5 to the transistor base. With this arrangement, with the falling of the output of oscillator 1 to a low level as in A in FIG. 2, diode D4 gives priority to the output of PWM circuit 7, and a base current is caused in transistor Q2 through diode D4 and resistor R5, thus turning on transistor Q2 and holding the collector voltage thereon at 0 irrespective of the output level of error amplifier 6. With the rising of the inverter output to a high level as in A in FIG. 2, diode D4 is turned off, and the base current in transistor Q2 is controlled according to the output of error amplifier 6. The AC component amplitude thus is held constant due to the voltage drop across resistor R1. This arrangement again permits stabilization of the AC component.

Figure 7:
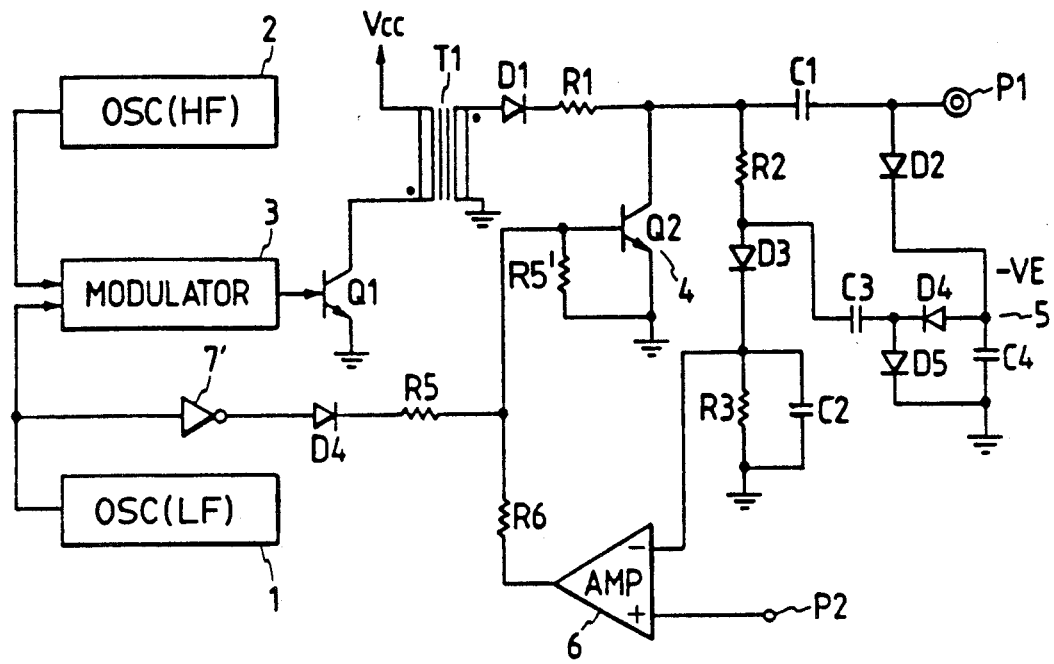
FIG. 7 is a diagram showing an example of a clamping power supply.

In the instance of FIG. 7, clamping DC voltage 5 is produced from the output of switch 4. More specifically, a voltage from an amplitude detection circuit, i.e., voltage from the point of connection between resistor R2 and diode D3, is supplied to a double voltage rectifier consisting of diodes D4 and D5 and capacitors C3 and C4, thus obtaining a clamping voltage of −VE. With this arrangement, a power supply unit can be constructed simply and inexpensively without the use of any separate power supply. In addition, since the DC component is produced using the stabilized AC component, there is no need of providing any separate stabilizer, and stabilization of the AC and DC components can be readily obtained.

Figure 8:
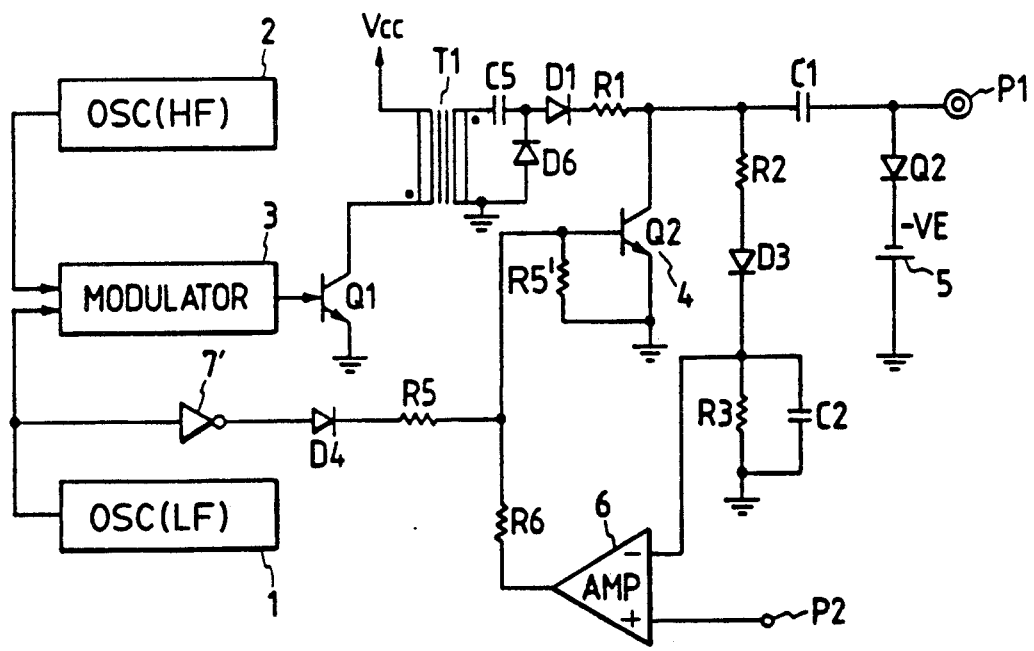
FIG. 8 is a diagram showing an example of a converter transformer secondary side circuit.

In the instance of FIG. 8, the secondary side output of step-up transformer T1 is double voltage rectified by capacitor C5 and diodes D1 and D6 to generate an AC component voltage V1. The feedback arrangement is the same as in the case of FIG. 7. With this arrangement, the breakdown voltage of the step-up transformer T1 can be reduced, thus permitting a simpler and more inexpensive construction to be obtained.

Figure 9:
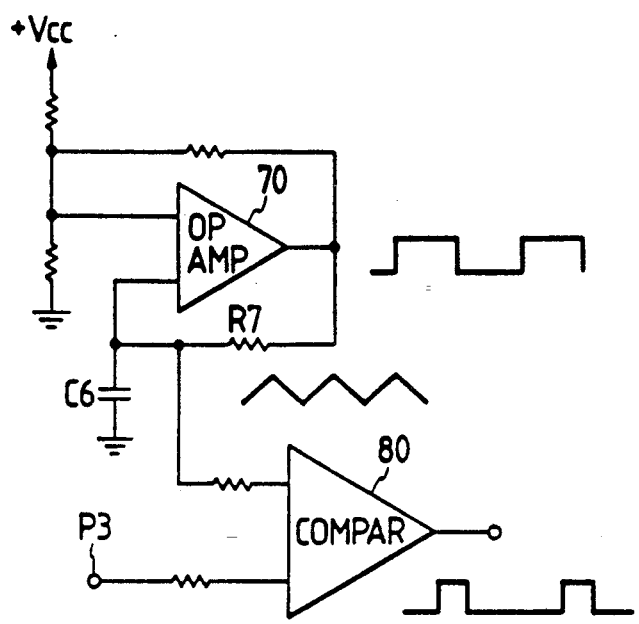
FIG. 9 is a diagram showing an example of a variable duty ratio low frequency oscillator.

The (LF) oscillator for generating a low frequency output may use a well-known circuit construction. For example, a construction as shown in FIG. 9 may be used. This oscillator consists of operational amplifier 70 with a feedback time constant provided by resistor R7 and capacitor C6. Operational amplifier 70 provides a pulse output as shown from its output terminal, while a sawtooth or triangular waveform as shown is produced from the point of connection between resistor R7 and capacitor C6. By comparing this triangular waveform signal by comparator 80 with a reference voltage (DC voltage) supplied from terminal P3, it is possible to permit comparator 80 to supply a pulse output with a duty ratio corresponding to the reference voltage. Thus, with this arrangement it is possible to control the duty ratio of the AC component of a developing bias for an electrophotographic image forming apparatus, for instance, which has heretofore been impossible.

Figure 10:
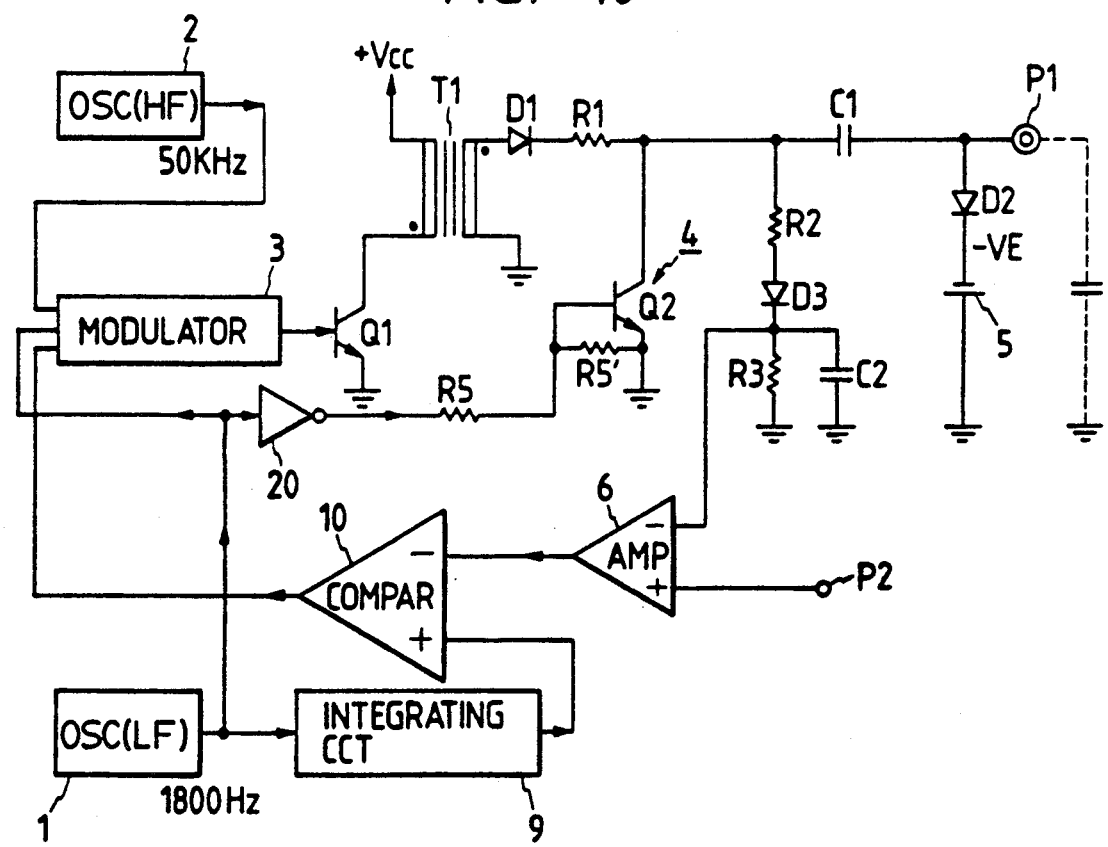
FIG. 10 is a diagram showing an instance of output amplitude stabilization through pulse number control.

FIG. 10 shows a further embodiment of the invention in which the number of output pulses are supplied from the (HF) oscillator 2 to the base or transistor Q1 for modulation output amplitude stabilization.

More specifically, in this instance the output voltage (V1) of switch 4 is divided, rectified and smoothed by resistors R2 and R3, diode D3 and capacitor C2, the resultant voltage is supplied to an error amplifier 6 for comparison to a reference voltage, which corresponds to a predetermined output amplitude and is supplied from the outside to terminal P2, and the error amplifier output is supplied to one input terminal of a comparator 10.

To the other in terminal of comparator 10 is supplied the output of the (LF) oscillator 1 through an integrating circuit 9, which uses a CR filter or an operational amplifier. The output of oscillator 1 is further supplied to inverter 20, which controls transistor Q2 constituting switch 4, and also to a control input terminal of the modulating circuit 3.

Switch 4 consists of a high breakdown voltage transistor or FET, the base of which is controlled from inverter 20 through bias resistors R5 and R5'. Transistor Q2 is controlled to be "on" while a low level output of oscillator 1 prevails.

Figure 11:
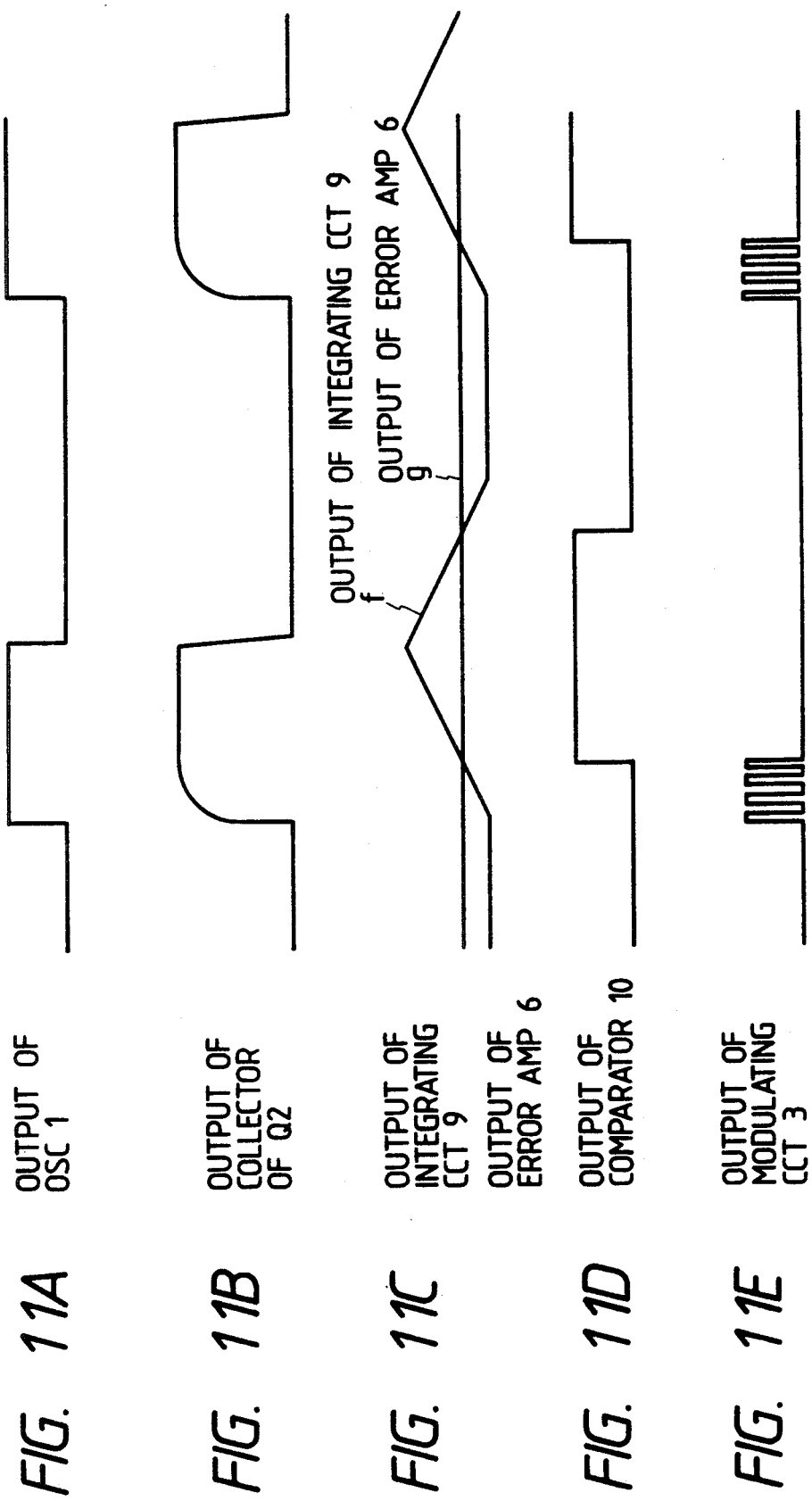
FIGS. 11A to 11E are waveform charts showing voltage waveforms appearing in various parts of the construction shown in FIG. 10.

FIG. 11 is a waveform chart illustrating the operation of the construction shown in FIG. 11.

Oscillators 1 and 2, like the previous embodiments, are oscillated at a low frequency (i.e., 1,800 Hz) and a high frequency (i.e., 50 kHz), respectively, as shown in A and E in FIG. 11. Transistor Q4 constituting switch 4 is on-off operated in synchronism to the pulse output of oscillator 1, as shown in B in FIG. 11.

Error amplifier 6 compares a reference voltage, which corresponds to a predetermined AC component amplitude and is supplied from terminal P2, and a voltage, which corresponds to the actual amplitude and is obtained from resistor R3 (shown at g in C in FIG. 11), and its output is supplied to comparator 10. To the other input terminal of comparator 10 is supplied the output of integrating circuit 9 (having a waveform as shown at f in C in FIG. 11). Thus, comparator 10 provides pulse output while the waveforms f and g in C in FIG. 11 are f >g, i.e., as shown in D in FIG. 11.

The output signal of comparator 10 has an effect of permitting the modulating operation of modulating circuit 3 only during its low level period.

In the above way, the number of high frequency pulses supplied to transistor Q1 is controlled according to the AC component amplitude for stabilizing the AC component amplitude.

Figure 12:
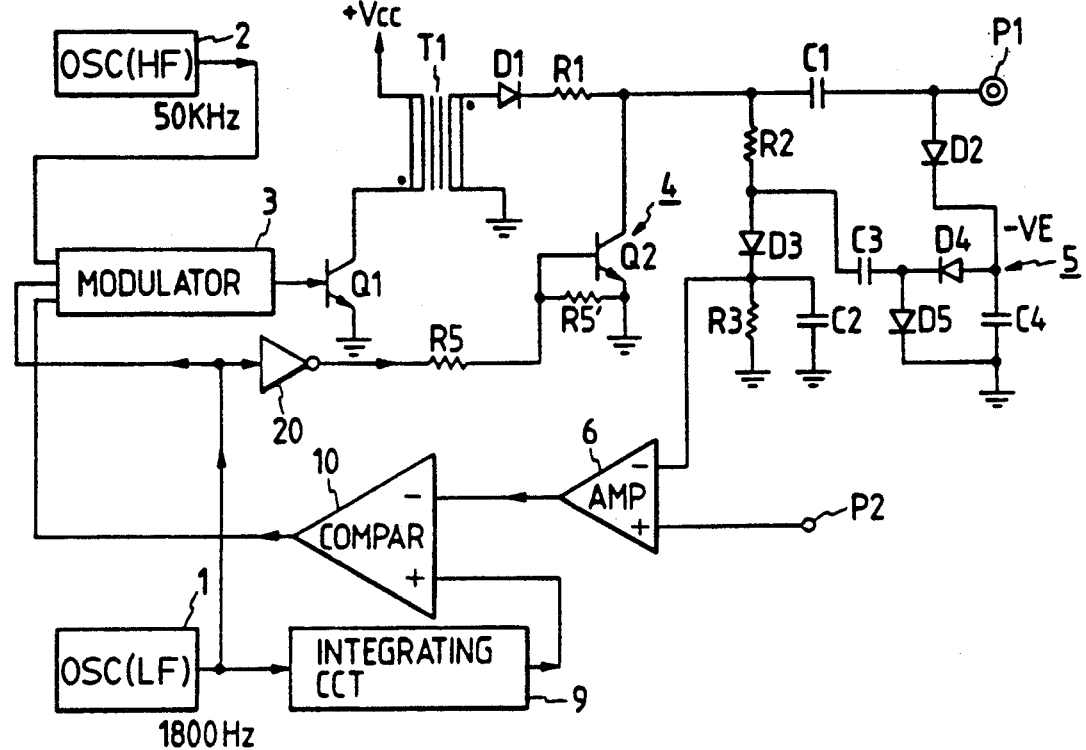
FIG. 12 is a diagram showing an example of a clamping power supply.

FIG. 12 shows a further embodiment, which effects the stabilization of the AC component amplitude in a manner as in the instance of FIG. 10. In this instance, however, DC voltage 5 for clamping is provided from the point of output of switch 4.

More specifically, as shown in FIG. 12, voltage from an amplitude detection circuit, i.e., from a point of connection between resistor R2 and diode D3, is supplied to a double voltage rectifying circuit consisting of diodes D4 and D5 and capacitors C3 and C4, thus obtaining a clamping voltage of -VE. With this arrangement, a power supply unit can be constructed simply and inexpensively without the need of using any separate power supply. In addition, since the DC component is produced using the stabilized AC component, it is possible to readily obtain stabilization of the AC and DC components without the need of using any separate stabilizing circuit.

Figure 13:
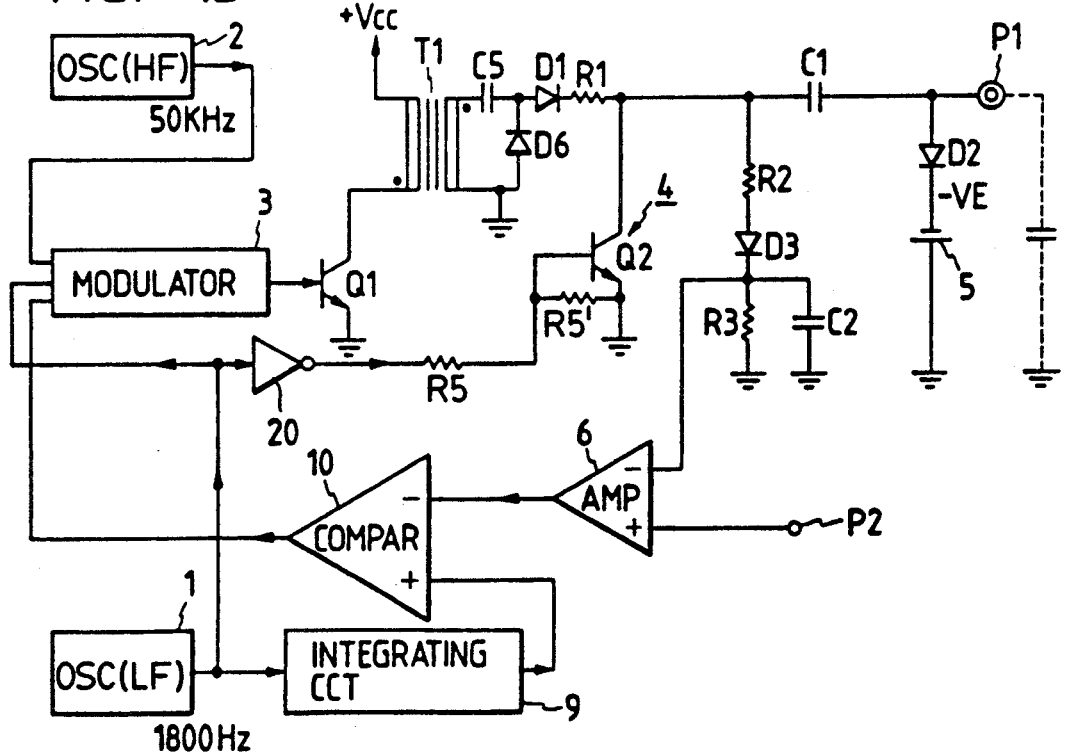
FIG. 13 is a diagram showing a converter transformer secondary side output circuit.

FIG. 13 shows a further embodiment. In this instance, the secondary side output of step-up transformer T1 is double voltage rectified by capacitor C5 and diodes D1 and D6 to generate an AC component voltage V1. With this arrangement, the breakdown voltage of the step-up transformer T1 can be reduced, thus permitting simpler and more inexpensive construction to be obtained. The other arrangement is the same as in the case of FIG. 10.

Figure 14:
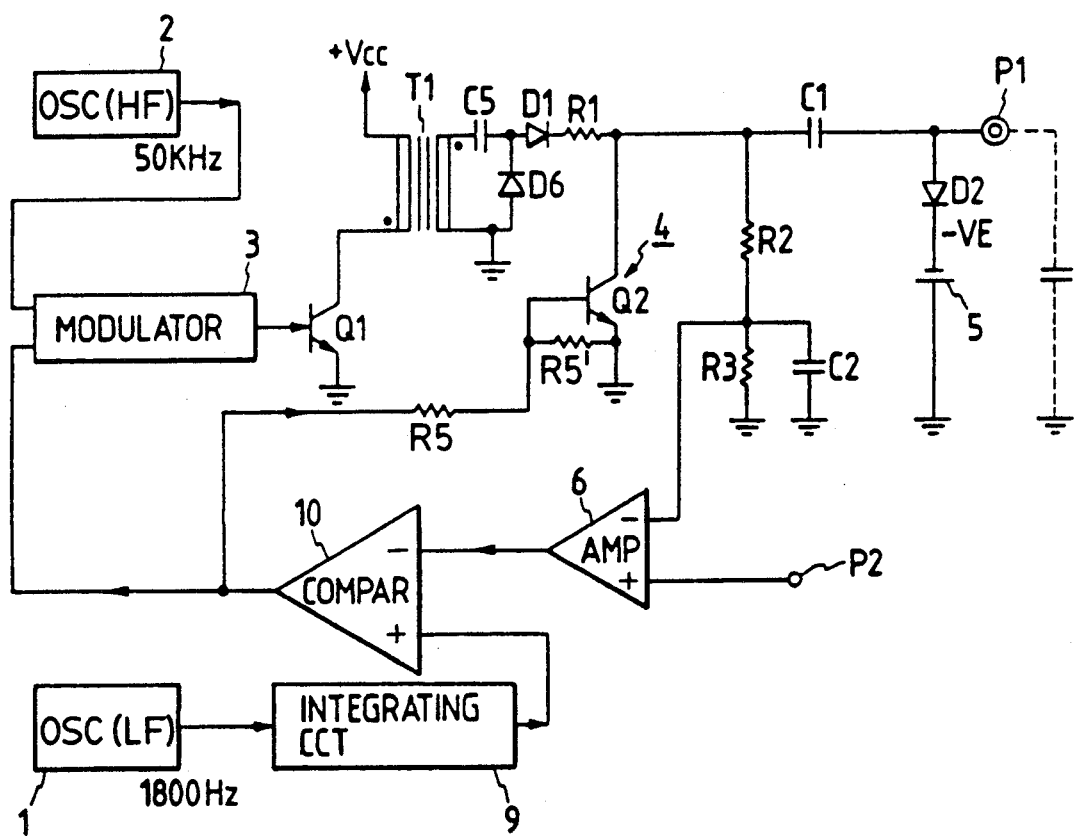
FIG. 14 is a diagram showing an embodiment of a power supply device, in which stabilization control is done by detecting the average value of output.

FIG. 14 shows a further embodiment, in which switch 4 is controlled according to the output of comparator 10. The other arrangement is the same as in the case of FIG. 13.

The output voltage of switch 4 (i.e., collector voltage V1 on transistor Q2) is supplied to an average value circuit (i.e., voltage-dividing/integrating circuit) consisting of resistors R2 and R3 and capacitor C2. The obtained average value output is supplied to error amplifier 6 for comparison to a reference value externally supplied to terminal P2 and corresponding to a predetermined average value. The error signal output of comparator 6 is supplied to comparator 10.

The operation of the above construction will now be described with reference to FIG. 15.

Figure 15:
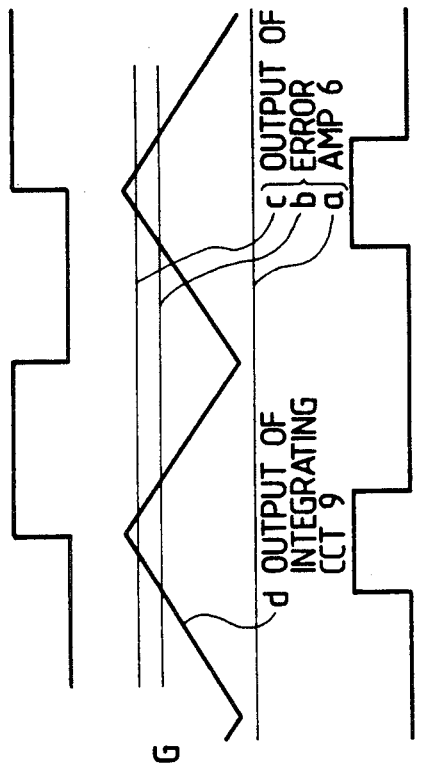
FIGS. 15A to 15F are waveform charts showing power waveforms appearing in various parts of the construction shown in FIG. 14.

Switch 4 in FIG. 14 is "off" while the output of comparator 10 is at high level, as shown in C and E in FIG. 15. During this period, the primary side of step-up transformer T1 is held "off" via transistor Q1.

Meanwhile, during a period, in which the output of comparator 10 is at high level and transistor Q1 is driven by a drive signal at 50 kHz provided from oscillator 2 (shown in D in FIG. 15), a voltage of +V1 is obtained at the cathode of the clamping diode D1 and is smoothed by the capacitances of clamping capacitor C1 and load. The output of switch 4 thus has a waveform as shown in E in FIG. 15.

The output obtained here is coupled by capacitor C2 for AC coupling to output terminal P1. However, diode D2 is turned on at a positive peak to clamp the output to -VE of clamping power supply 5. Thus, an output with an amplitude of V1 (1,200 V) and a positive peak of -VE (-300 V), as shown in E in FIG. 15, is obtained at terminal P1.

The output voltage of switch 4 is divided to a predetermined value and smoothed by an average value circuit consisting of resistors R2 and R3 and capacitor C2.

The average value output is compared by error comparator 6 with the reference signal supplied to terminal P2.

Comparator 10 co-operates with integrating circuit 9 for pulse width modulation, and it produces a control signal A (shown in C in FIG. 15) by comparing the integral output of the (LF) oscillator 1 and the output of error amplifier 6. The control signal A drives the base of high breakdown voltage transistor Q2 of switch 4, and it is also supplied to modulating circuit 3 to modulate the output of oscillator 2 to produce a control signal B, as shown in D in FIG. 15, for driving the base of switching transistor Q1 on the primary side of step-up transformer T1.

With the above arrangement, transformer T1 is driven by high frequency driving. Therefore, there is no need of using a large scale transformer capable of low frequency driving, so that it is possible to construct a small-size and light-weight power supply unit. In addition, it is readily possible to cope with noise. Further, since no low frequency transformer is used, it is possible to control the output signal duty ratio.

Further, since double voltage rectification is effected on the secondary side of the step-up transformer, the breakdown voltage of the step-up transformer may be low. Further, the AC component duty ratio can be controlled in a large range through terminal P2.

Further, the average DC level of the superimposed AC-DC output signal is fed back to the primary side of step-up transformer T1 to control the duty ratio of the step-up transformer drive pulse. Thus, where the load is a developing unit of an electro-photographic image-forming apparatus, it is possible to perfectly eliminate a hazardous leak from between the developing sleeve and the photosensitive medium due to a rise of the peak DC level of output by supplying an appropriate reference value from terminal P2.

Figure 16:
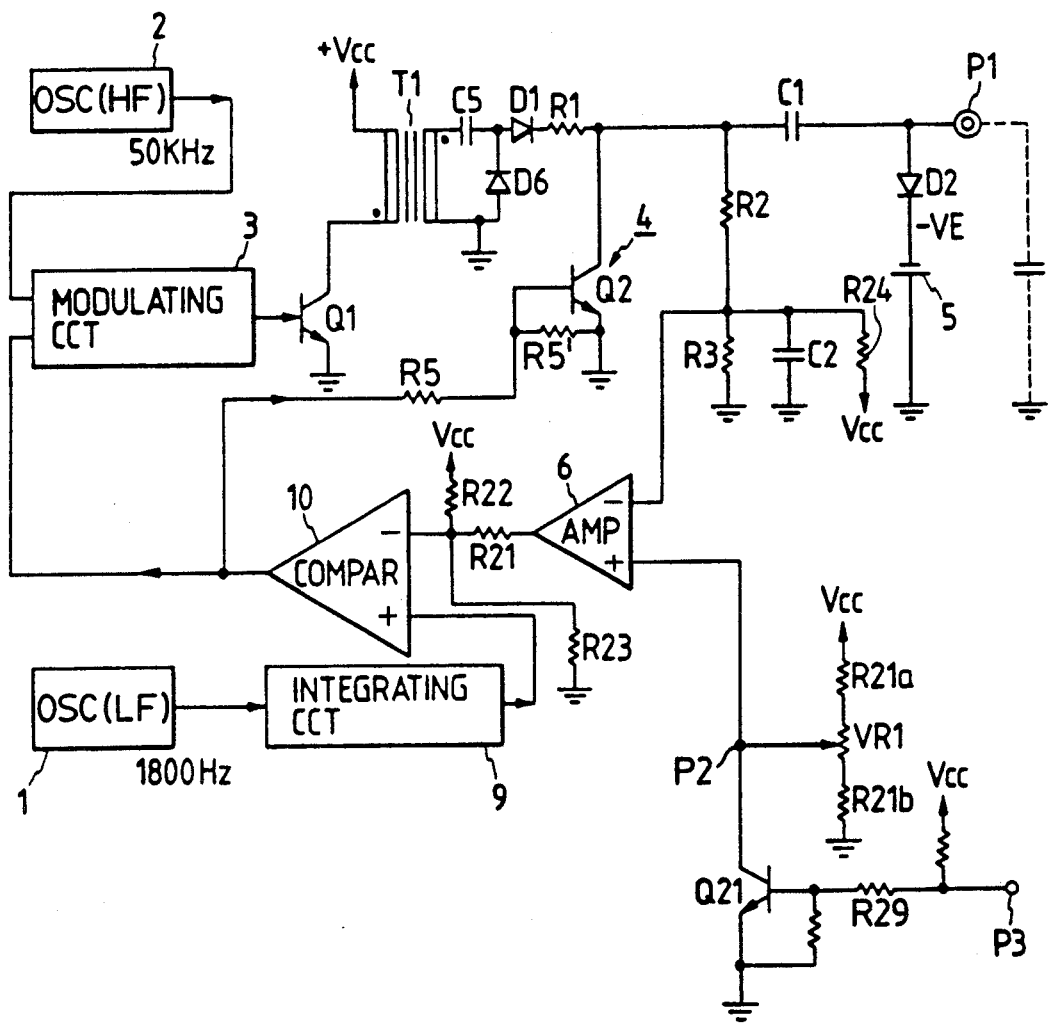
FIG. 16 is a diagram showing an embodiment, in which a density control circuit and a remote control circuit are added to the embodiment of FIG. 14.

The arrangement shown in FIG. 14 can be modified as shown in following Figures including FIG. 16, in which parts like those in FIG. 14 are designated by like reference numerals and are not described any further.

The embodiment of FIG. 14 is concerned with an arrangement of controlling the average level of output according to the sole input signal to terminal P2. In the case of particularly an electrophotographic image-forming apparatus, an arrangement as shown in FIG. 16 may be adopted for obtaining density control through control of the AD component of the developing and also remote control of the developing bias.

In the instance of FIG. 16, the reference voltage supplied from terminal p2 is generated by resistors 21a and 21b and variable resistor VR1 connected between a power supply voltage terminal at Vcc and ground. A transistor Q21 is connected between a mid point tap of variable resistor VR1 and ground, and the supply of developing bias is controlled by an on-off operating transistor Q21. The base of transistor Q21 is pulled up by the power supply voltage of Vcc, and transistor Q21 is on-off controlled by a control signal at terminal P3 through bias resistor R29.

The output terminal of error amplifier 6 is shifted in potential level by resistors R21 to R23. More specifically, the level shift is effected by selecting resistors R21 to R23 such that the maximum DC level of the error amplifier output (shown at c in B in FIG. 15) is lower than the maximum value of the output of integrating circuit 9 by a predetermined determined value and the minimum DC level of the error amplifier output (shown at a in B in FIG. 15) is slightly lower than the minimum value of the output of integrating circuit 6.

In the construction of FIG. 16, transistor Q1 is turned on when the signal applied to remote control signal input terminal P3 goes to high level or becomes open. The average value circuit is given a positive bias through resistor R24 such that the minus input to error amplifier 6 is positive for a predetermined level even if the output of switch 4 is zero. Thus, the output level of error amplifier 6 is at minimum.

The output of error amplifier 6 is converted by resistors R21 to R23 to a level lower than the minimum output level of integrating circuit 9, as shown at a in B in FIG. 15, before being supplied as a minimum input to comparator 10. Thus, the comparator output is at a high level.

Thus, transistor Q1 is "off" at all times while transistor Q2 is "on" at all times. The output of switch 4 thus quickly becomes 0 V to provide −VE at output terminal P1.

Meanwhile, when the potential at remote control input terminal P1 becomes zero level, transistor Q21 is turned off, and a value selected by the density control is supplied as a plus input to error amplifier 6. The output of error amplifier 6 thus is changed from the minimum level to the maximum level. The positive pulse width of the comparator output thus is gradually increased from zero. Further, transistors Q1 and Q2 start operation to raise the output of switch 4 to +V1 and also gradually increase the average DC level of the output. When the average DC level is made equal to a preset value set by variable resistor VR1 with the minus input to error amplifier 6, the output of error amplifier 6 is stabilized.

With the arrangement of FIG. 16, image density control can be obtained by detecting the average DC component of the developing bias, comparing the detected value in error amplifier 6 to the reference voltage determined by variable resistor VR1 and feeding back the resultant error signal to the primary side of step-up transformer T1. In other words, the average DC level of the developing bias, which is in closest relation to the image density, is detected for varying the duty ratio of the pulse. It is thus possible to perfectly eliminate the hazardousness of a leak between the developing sleeve and the photosensitive medium due to a peak DC level rise of the power supply signal pulse component.

Further, with the above arrangement it is possible to obtain ready and quick remote control of the developing bias, which has heretofore been very difficult.

Figure 17:
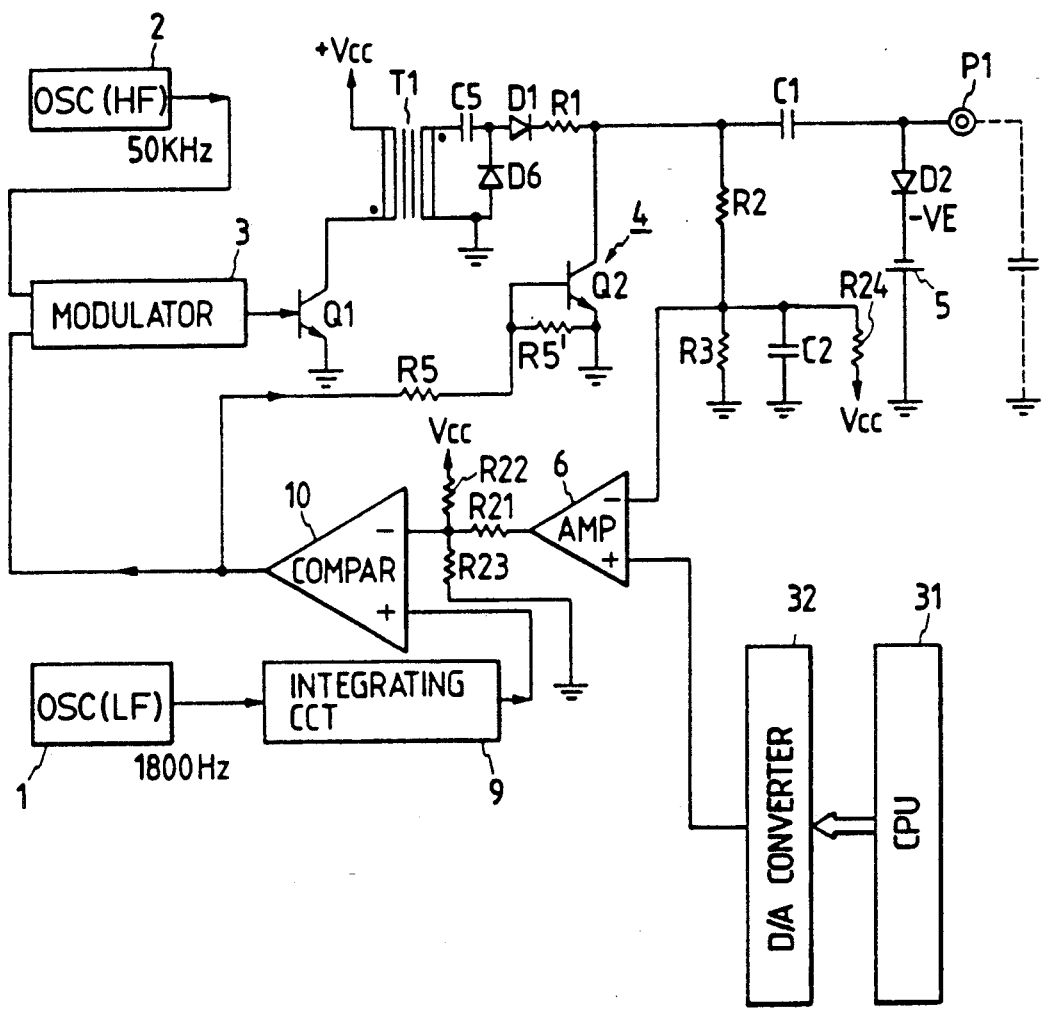
FIG. 17 is a diagram showing a further embodiment, in which a CPU effects a density setting and the remote control of power supply.

In the instance of FIG. 16 the image density control and remote control of the developing bias are effected according to the setting of variable resistor VR1 and a control signal supplied from terminal P3. However, the same advantages as with the arrangement of FIG. 16 can be obtained with an arrangement shown in FIG. 17, in which the plus input terminal of error amplifier 6 is controlled from CPU 31, i.e., the main controller of the image forming apparatus, through D/A converter 32.

While in the above instances a pulse signal is used as a low frequency signal, it is also possible to use a sinusoidal waveform as shown in the following.

In the following instance, the transformer primary side switching is controlled according to an error between the transformer secondary side rectified output voltage and a sinusoidal signal as reference voltage, thus obtaining a sinusoidal output signal without the use of any low frequency transformer. In addition, the degree of conduction between the rectifier output terminal and ground is controlled under a condition corresponding to an error signal between the rectified output voltage and the sinusoidal signal, thus preventing waveform distortion due to the load capacitance.

Figure 18:
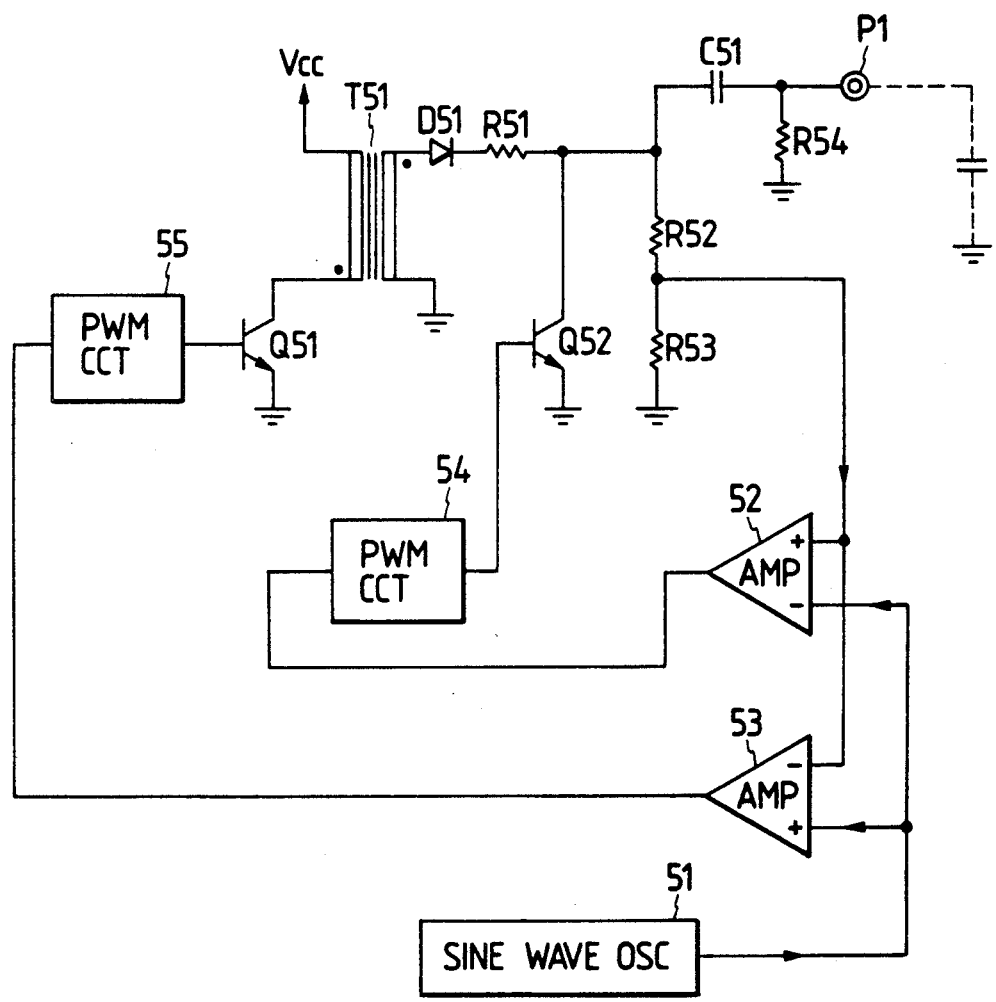
FIG. 18 is a diagram showing a further embodiment, in which a sinusoidal signal is used for modulation.

FIG. 18 shows this embodiment of a power supply device, and FIG. 19 shows voltage waveforms appearing in various parts of the circuit of FIG. 18.

Referring to the Figures, designated at T51 is a high frequency converter transformer, which is oscillated at around 50 kHz. One end of the primary winding of transformer T51 is held at a low power supply voltage of Vcc, and the collector-emitter path of transistor Q51 is inserted between the other end of the primary winding and ground. Transformer T51 is not a low frequency one but a high frequency one.

The base of transistor Q1 is driven by PWM (pulse width modulation) circuit 55. PWM circuit 55 supplies variable duty ratio pulses to control the switching of transistor Q1. To the PWM circuit 55 is supplied a control signal through a feedback system to be described later for stabilization of the output.

Diode D51 is connected to the secondary winding of transformer T51 for flyback mode operation. The rectified output is supplied through a filter circuit consisting of resistor R51, capacitor C51 and resistor R54 to terminal P1 and then to a load (for instance a capacitive load such as a charger).

Emitter-grounded transistor Q52 has its collector connected to the point of connection of resistor R51, capacitor C51 and resistor R54. This transistor Q52 is driven by PWM circuit 54. PWM circuits 54 and 55 have a frequency of 50 kHz.

The collector-emitter voltage (i.e., output voltage) of transistor Q52 is divided by a voltage divider consisting of resistors R52 and R53, and the division output is supplied to the plus and minus terminals of respective error amplifiers 52 and 53. To the other terminals, i.e., minus and plus terminals, of error amplifiers 52 and 53 is supplied the output of sinusoidal oscillator 51. The outputs of error amplifiers 52 and 53 are supplied to respective PWM circuits 54 and 55 to control the duty ratio of the output pulses of PWM circuits 54 and 55.

The operation of the circuit shown in FIG. 18 will now be described.

In this circuit, basically the output signal to a sinusoidal waveform is controlled by supplying a sinusoidal signal as a reference signal for output voltage control to error amplifier 53 and controlling the switching through PWM circuit 55.

More specifically, if the load is purely resistive and has no capacitive component, as error amplifier 53 in FIG. 18 compares the output of sinusoidal oscillator 51 (as shown in A in FIG. 19) and an output voltage detection value from the point of connection between resistors R52 and R53 to provide an error signal (as shown in E in FIG. 19) for controlling the pulse width of PWM circuit 55 (as shown in C in FIG. 19), a sinusoidal waveform may be supplied to the load as shown by the dashed curve in B in FIG. 19 without transistor Q52.

However, in the case of a load with a capacitive component as shown by dashed lines in FIG. 18, if control of transistor Q52 is not made, the rectified output of diode D51 can not fall because of a slow discharge of accumulated charges into the load capacitance capacitance as shown by the solid curve in B in FIG. 19 (increased discharge speed resulting in extremely increased power loss). Therefore, the waveform is distorted, and also the amplitude is extremely reduced.

With transistor Q52 provided as in the case of FIG. 18 such as to be driven by output pulses from PWM circuit 54, as shown in D in FIG. 19, the PWM circuit being controlled according to an error signal (as shown in F in FIG. 19) from error amplifier 52, comparing the detection voltage from the voltage divider consisting of resistors R52 and R53 and the output of sinusoidal oscillator 51, extra charges in the load are forcively discharged through transistor Q52, so that the output waveform can have fidelity when its predetermined times the sinusoidal waveform that is provided as reference signal.

Thus, the above embodiment permits a power supply signal having a sinusoidal waveform to be supplied reliably to the load.

Further, since the output control to sinusoidal waveform is effected by feedback to the primary side of transformer T51, transformer T51 itself may be driven by high frequency driving without need of a heavy low frequency transformer as in the prior art.

Figure 20:
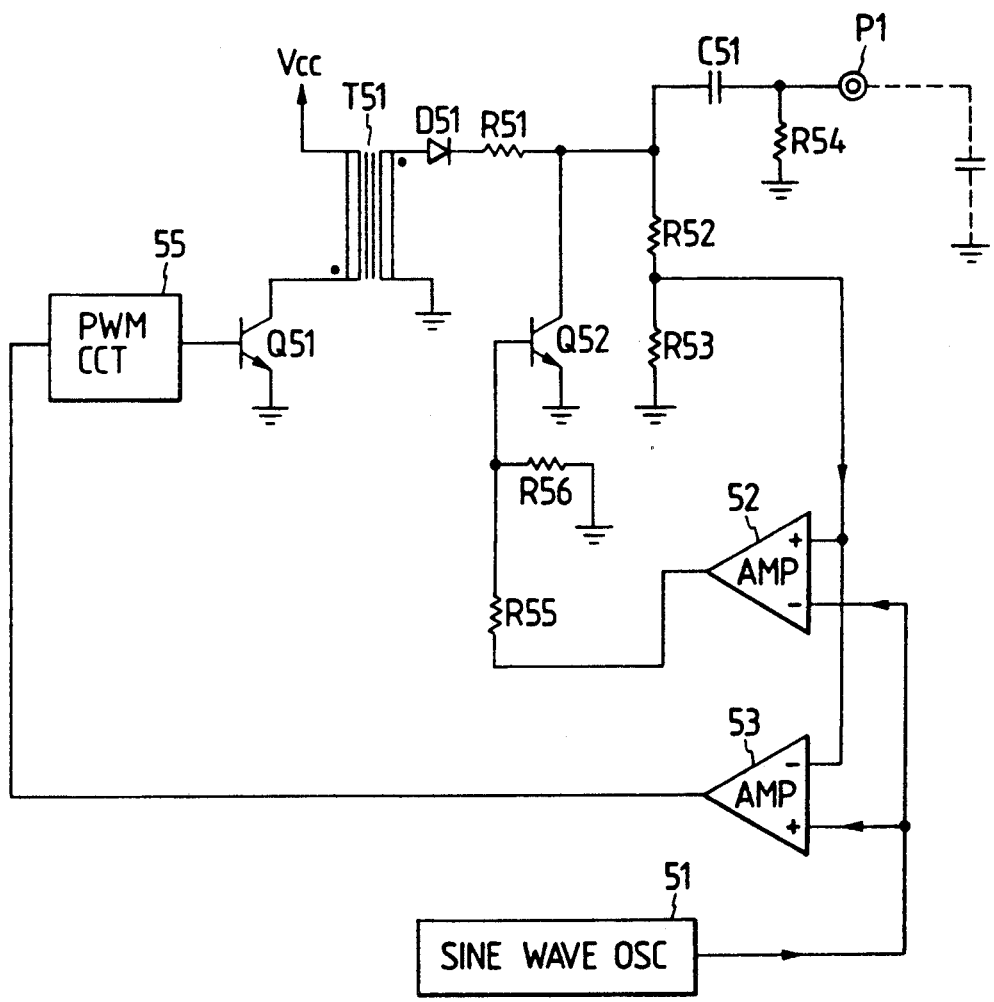
FIG. 20 is a diagram showing a further embodiment, which dispenses with the PWM circuit.

Modifications of the construction shown in FIG. 18 are shown in FIG. 20 and the following Figures. Parts like those in FIG. 18 are designated by like reference symbols and are not described any further.

FIG. 20 shows an instance, in which PWM circuit 54 shown in FIG. 18 is omitted. /In the instance of FIG. 18, transistor Q52 performs the switching operation. In the instance of FIG. 20, transistor Q52 operates as a Class A linear amplifier. More specifically, the collector current in transistor Q52 is controlled according to the output of error amplifier 52. With such a simple construction the same advantages as noted above can also be obtained.

Figure 21A:
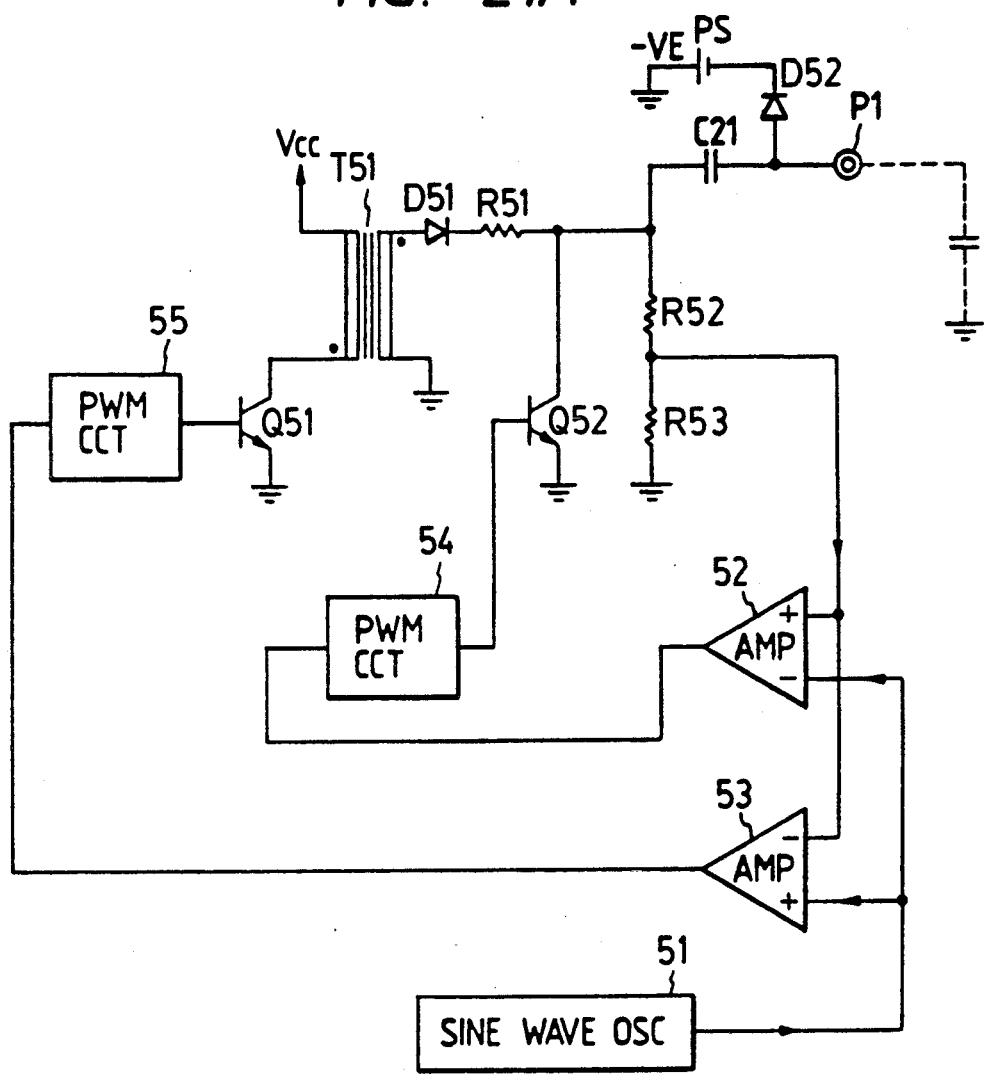
FIG. 21A is a diagram showing a further embodiment, in which DC is superimposed on output.
Figure 21B:
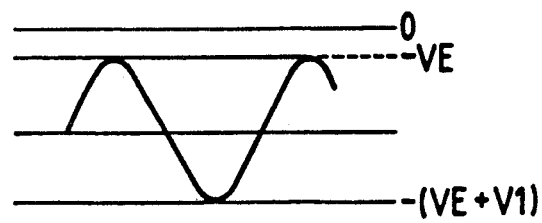
FIG. 21B is a waveform diagram showing an output waveform at a terminal shown in FIG. 21A.

FIG. 21A shows an instance of supplying a signal with superimposed DC. In this instance, a clamping circuit including diode D52 and power supply PS providing an output voltage of −VE is connected to terminal P1. With this arrangement, the power signal supplied to load can be clamped at a level shifted to the negative side by −VE, the output voltage of power supply PS. The peak of the output voltage is −VE plus the amplitude V1 of the sinusoidal component as shown in FIG. 21B.

Figure 22:
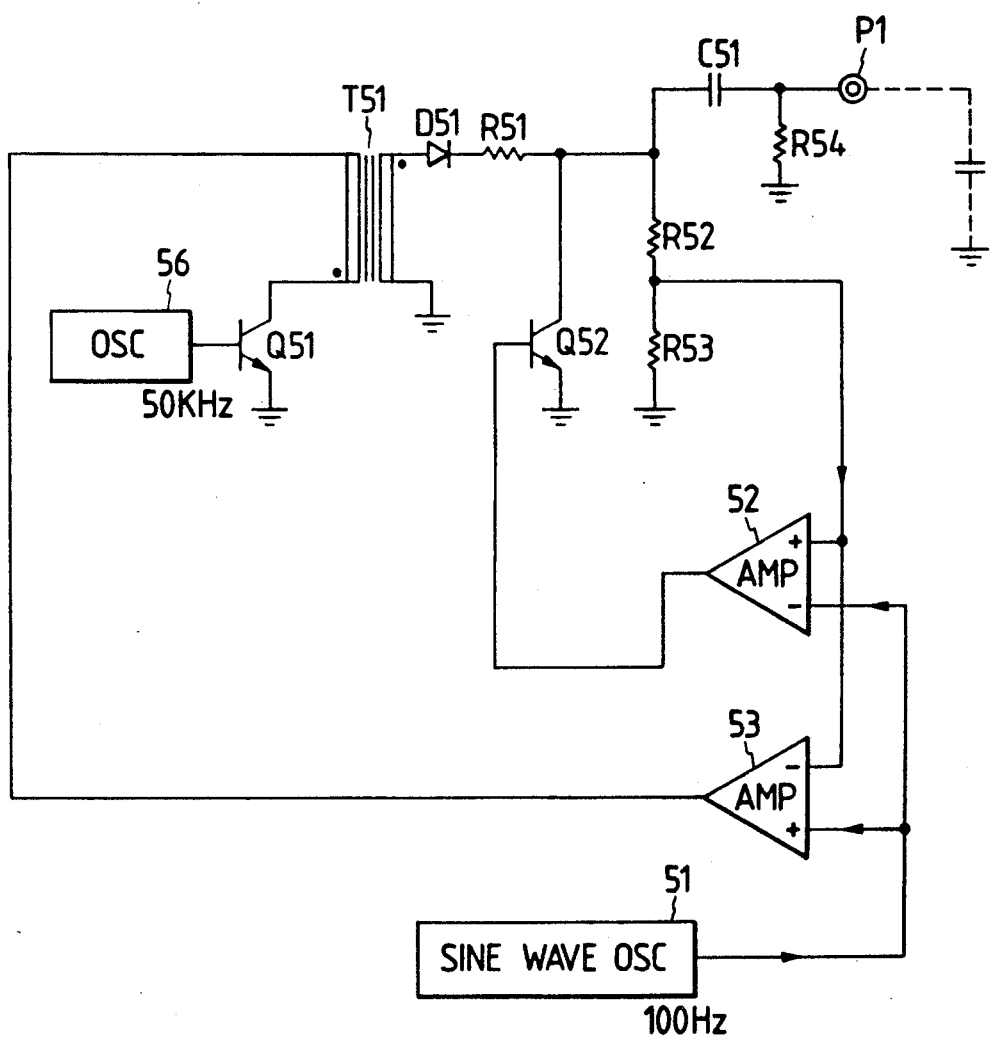
FIG. 22 is a diagram showing a further embodiment, which dispenses with the PWM circuit.

FIG. 22 is an instance, in which PWM circuit 55 is omitted. In this instance, transistor Q51 on the primary side of transformer T51 is driven by oscillator 56 oscillating at a fixed frequency (about 50 kHz), and the input voltage to the primary side of transformer T51 is controlled directly by error amplifier 53. This arrangement permits a simpler circuit construction to be obtained compared to the case of using a PWM circuit although the efficiency is slightly sacrificed, and thus it is suitable particularly for low power purposes. Error amplifier 23 may include a power amplifier or the like so as to be able to drive the primary side of transformer T51 sufficiently.

Figure 23:
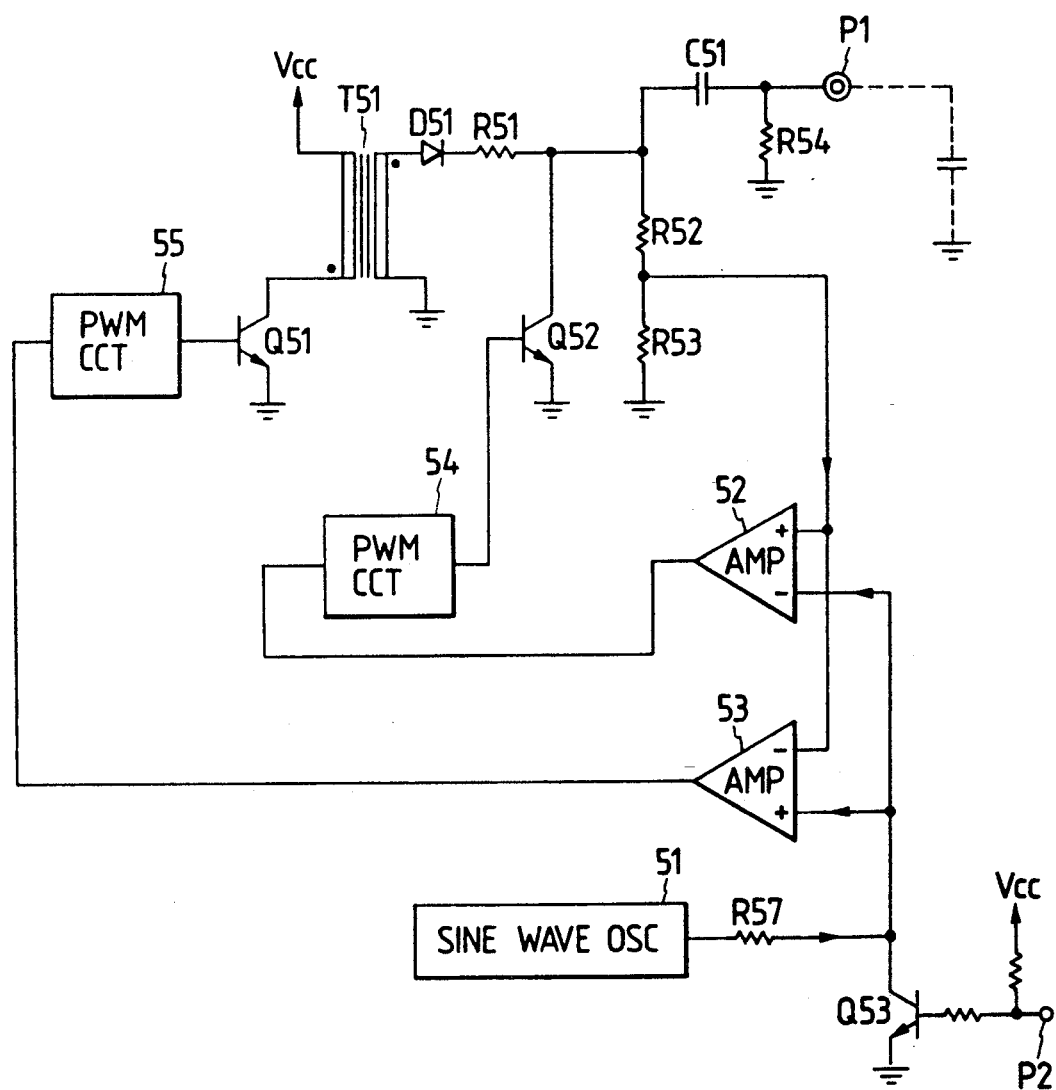
FIG. 23 is a diagram showing a further embodiment, which further comprises a remote control circuit for output control.

An arrangement as shown in FIG. 23 may be used when it is necessary to perform remote on/off control of the output. In this instance, the point of connection between sinusoidal oscillator 51 and error amplifier 53 can be grounded through transistor Q53. Transistor Q53 is on/off controlled by controlling its base through terminal P2. When blocking the output, terminal P2 is held at high potential level, and the output side of sinusoidal oscillator 51 is grounded through resistor R57.

With this arrangement, when applied to an image forming apparatus, the power supply to the load can be controlled, if necessary, during an image formation process.

Figure 24:
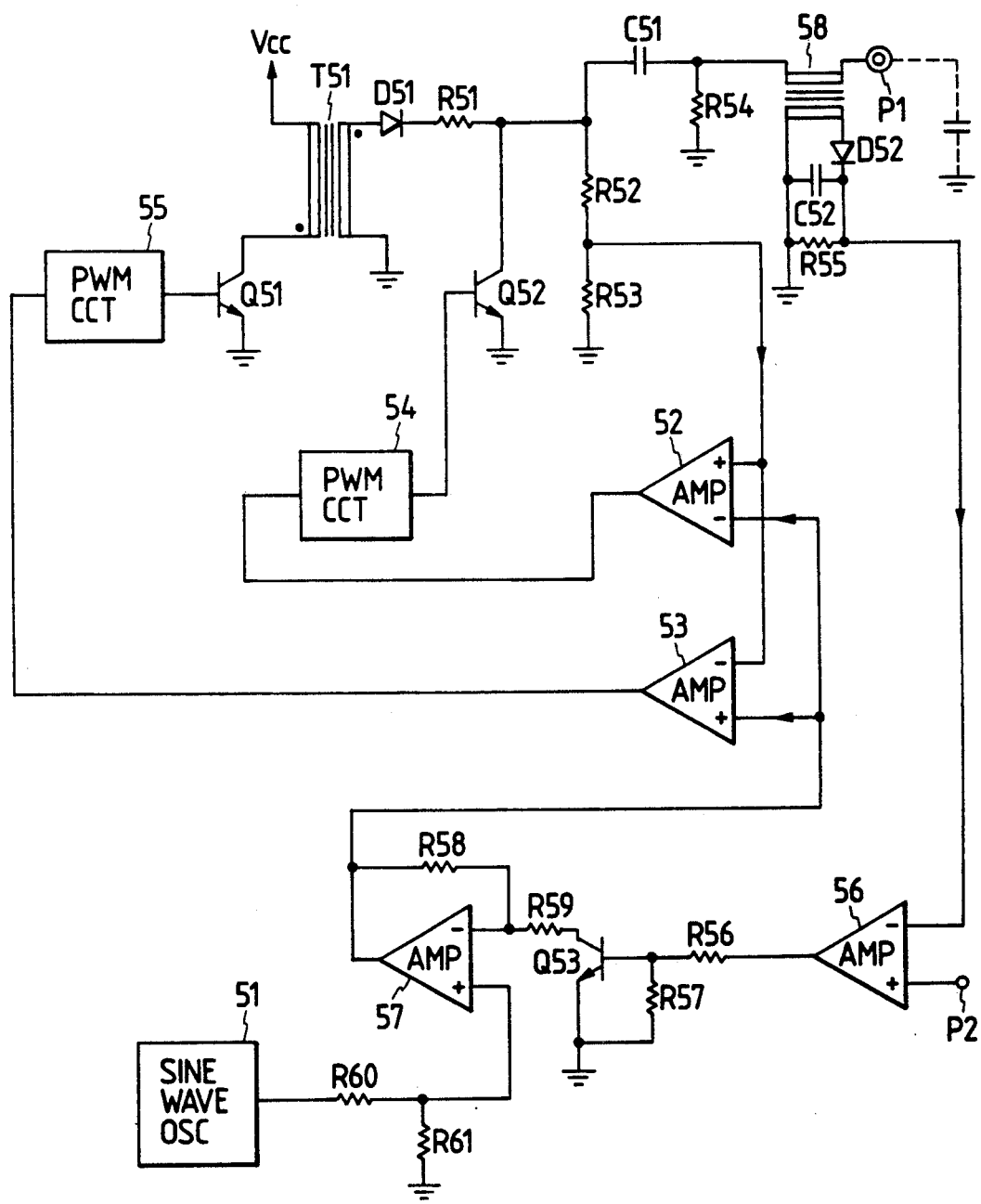
FIG. 24 is a diagram showing a further embodiment, in which load current is stabilized.

FIG. 24 shows an instance of detecting and stabilizing the load current.

In this instance, the primary winding of pulse transformer 58 is connected between the connection point between capacitor C51 and resistor R54 and terminal P1. The secondary wide output of pulse transformer 58 is rectified and smoothed by diode D52 and capacitor C52 before being applied across resistor R55. The terminal voltage across resistor R55 is proportional to a load current supplied from terminal P1. This detection signal is applied to a minus input terminal of error amplifier 56 to be compared to a reference voltage at terminal P2 and corresponding to a predetermined load current.

The error signal from error amplifier 56 is coupled to error amplifier 57 to control the amplitude of a sinusoidal signal supplied from sinusoidal oscillator 51 to error amplifiers 52 and 53.

More specifically, the output of sinusoidal oscillator 51 is attenuated by resistors R60 and R61 to a predetermined ratio before being applied to the plus input terminal of error amplifier 57. FET Q53 is connected in series with resistor R59 between the plus input terminal of error amplifier 57 and ground. The output of error amplifier 56 is divided by resistors R56 and R57 to a predetermined ratio before being applied to the gate of transistor Q53. The amplitude of sinusoidal waveform as output of error amplifier 57 is controlled with the drain-source resistance of transistor Q53 being varied according to the output of error amplifier 56.

With the above arrangement, it is possible to stabilize load current against variations of the load impedance and power supply voltage Vcc through control of the amplitude of the sinusoidal waveform supplied to the primary side circuit provided after error amplifiers 52 and 53 and having a construction like that shown in FIG. 18.

Figure 25:
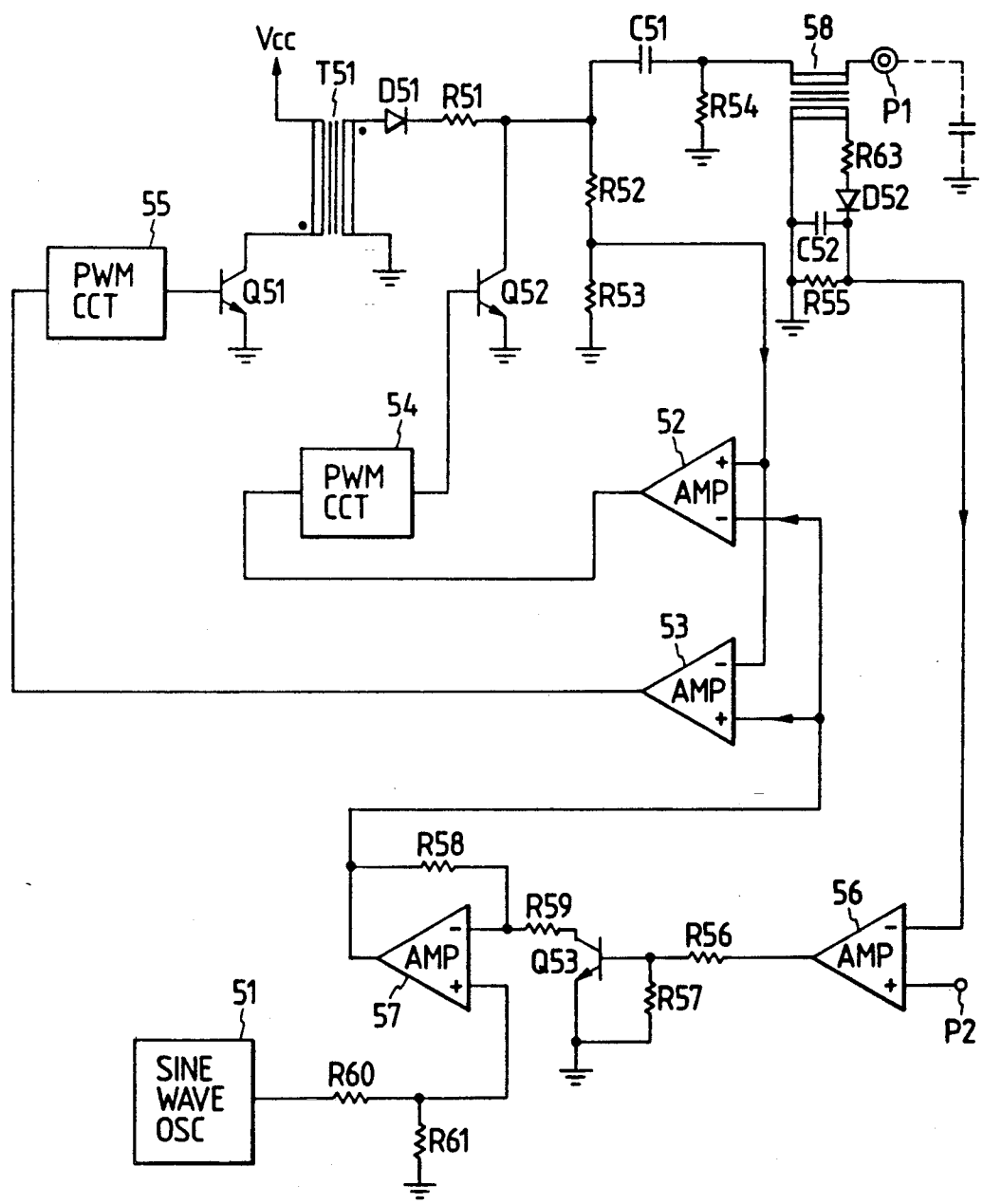
FIG. 25 is a diagram showing a further embodiment, in which a component close to the effective value of the load current is stabilized.

FIG. 25 shows a modification of the construction shown in FIG. 24. In this instance, resistor R63 is provided in series with rectifying diode D52 on the secondary side of pulse transformer 58. Thus, by appropriately selecting the resistance of resistor R63 a stabilization of the load current depending on effective value of the load current, can be obtained through detection of a value close to the effective value.

FIG. 26 shows an instance of detecting load current without the use of pulse transformer 58. In this instance, the secondary side common potential of step-up transformer T51 is set aloof from ground potential through resistor R62. The load current flows through resistor R62. Since the terminal voltage across resistor R62 is proportional to the load current, the detection voltage is led to the minus input terminal of error amplifier 56.

Control like that described before is possible by rectifying the terminal voltage across resistor R62 and supplying the rectified voltage to error amplifier 56. In this case, linear detection circuit 58' is used in lieu of a rectifying circuit including a diode. This is done in order to avoid the influence of non-linearity concerning current and voltage characteristics of diode for the resistance of the resistor R62 is set to be low for the purposes of reducing the error of amplitude detection by the voltage division by resistors R52 and R53 and avoiding interference with the driving of transistor Q52.

With this arrangement, the same advantages as in the case of using pulse transformer 58 can be obtained.

In the above instances, a single transistor is used as switch 4. However, a plurality of transistors may be connected in series to the same end.

Figure 27:
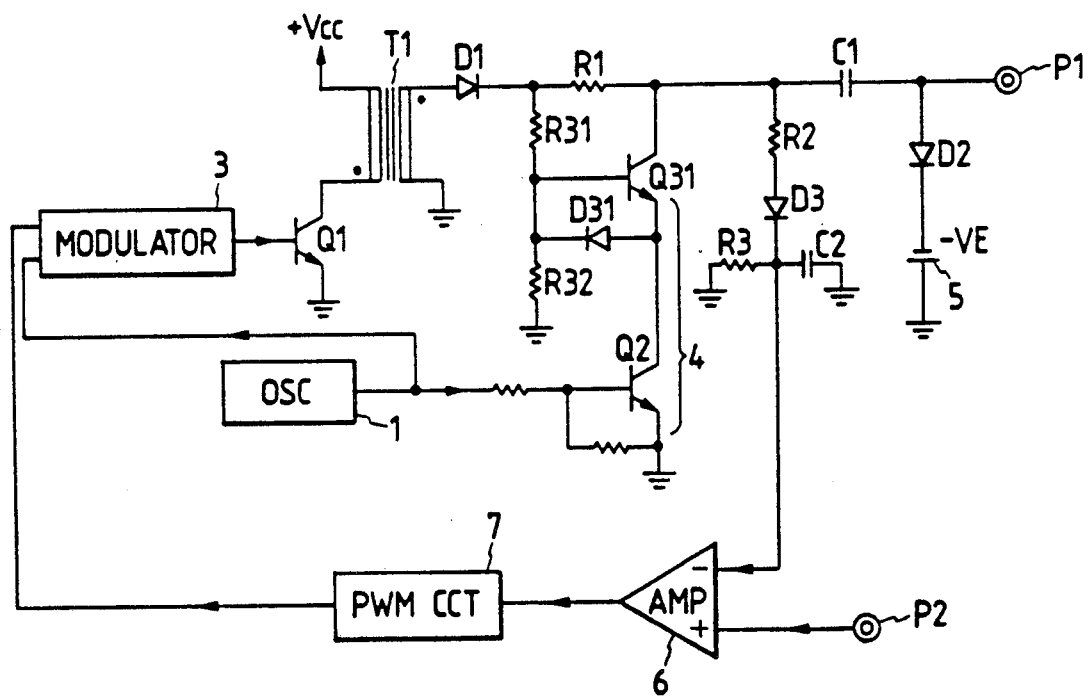
FIG. 27 is a diagram showing a further embodiment, which uses a plurality of series-connected transistors as a switch.
Figure 27:
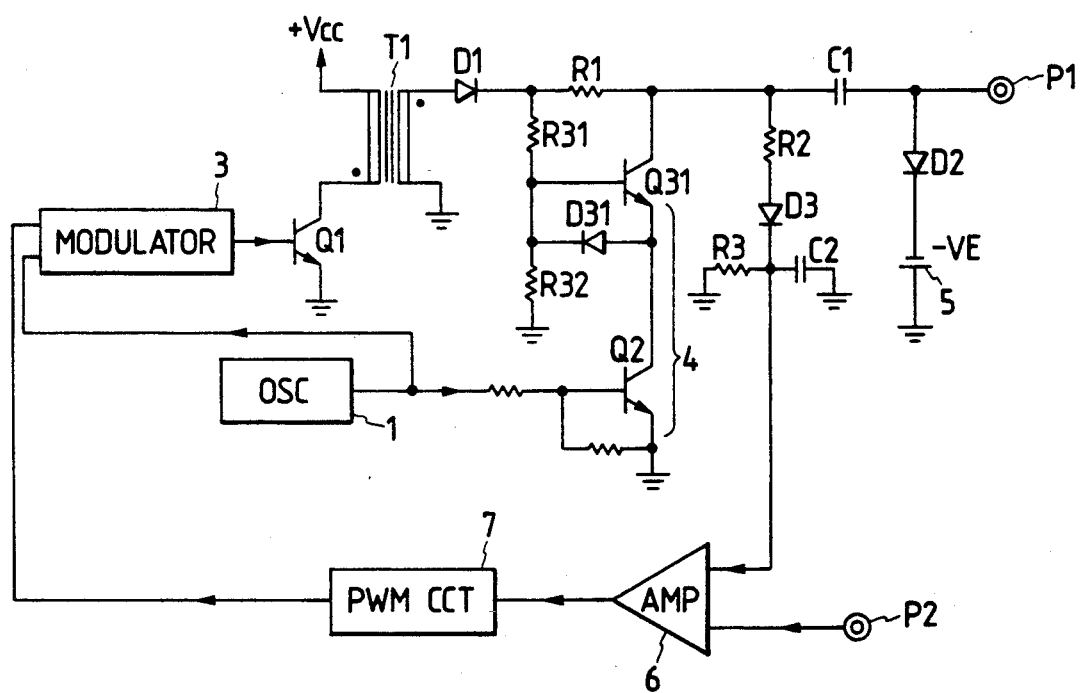

FIG. 27 shows an embodiment, in which a plurality of switches like switch 4 shown in FIG. 5 are connected in series. Designated at Q2 and Q31 in the Figure are a plurality of series-connected transistors used as electronic switch 4. The absolute maximum rating of the collector-emitter path of transistor Q2 is set such that when an overshoot of the rectified output of rectifying diode D1 results, the output voltage of diode D1 is divided by resistors R31 and R32 to one half before being applied to the base of transistor Q31, thus applying the one-half voltage between the collector and emitter of each of transistors Q2, Q31. When transistor Q2 is turned off, one half the voltage of the rectified output of diode D1 is applied to the base of transistor Q31. Since transistor Q2 is "off" at this time, no current is passed to the emitter of this transistor. However, the emitter of transistor Q31 is held substantially at the same potential as the base potential by the base-emitter junction diode. For this reason, the collector-emitter paths of transistors Q2 and Q31 share respective one-halves of the rectified output of diode D1. As soon as transistor Q2 is turned on by the output of oscillator 1, transistor Q31 is turned on for there has been its base bias. Diode D31 is provided for preventing reverse biasing of the base-emitter junction of transistor Q31.

The secondary side rectified output of converter transformer T1 is coupled through voltage division resistors R2 and R3, diode D3 and smoothing capacitor C2 to error amplifier 6 for comparison with a predetermined reference voltage supplied from terminal P2, thus detecting the amplitude component of the rectified output, the detected amplitude component value being used to control the primary side of converter transformer T1 through PWM circuit 7. Stabilized output thus can be supplied.

Transistors Q2, Q31 may be replaced with high breakdown voltage FETs. In this case, the FET gate voltage is controlled such that the FET drain voltage component has a predetermined value. Further, the FETs have their drains and sources connected to one another, and to their gates is applied a voltage substantially equal to the output of a voltage divider consisting of series resistors R31 and R32 for dividing the secondary side rectified output of converter transformer T1. In this way, stabilized output can be obtained.

Figure 28:
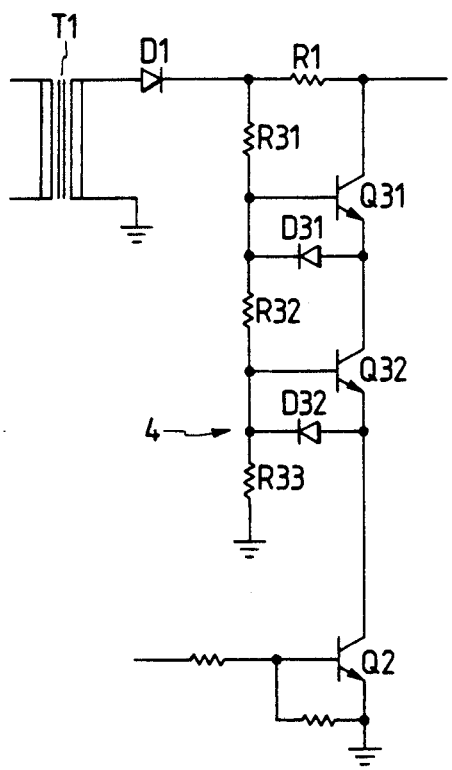
FIGS. 28 and 29 are circuit diagrams showing examples of a switch.
Figure 29:
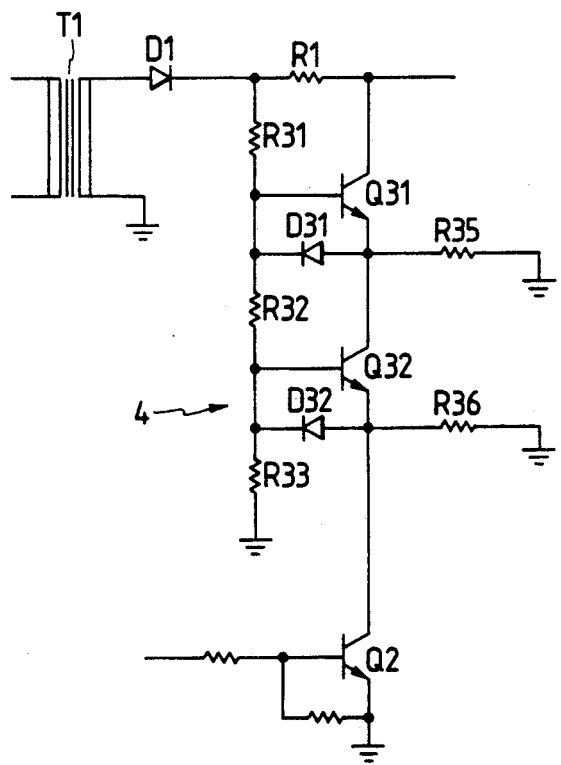

FIGS. 28 and 29 show specific examples of electronic switch 4. In the case of FIG. 28, the rectified output of diode D1 is divided by resistors R31 to R33 to one-thirds to be shared by respective transistors Q2, Q31 and Q33. In the case of FIG. 29, resistors R35 and R36 having high resistance so that they do not substantially present a power consumption problem are each inserted between the emitter of each of transistors Q31 and Q32 and ground. Switching speed thus is improved.

With the constructions as shown in FIGS. 27 to 29, a high voltage output can be obtained without being limited by the voltage rating of a switching element. In addition, there is no need of using a transistor of low current, power and hFE ratings because of high breakdown voltage limitation. High speed output response design thus is possible for high power loads.

Figure 32:
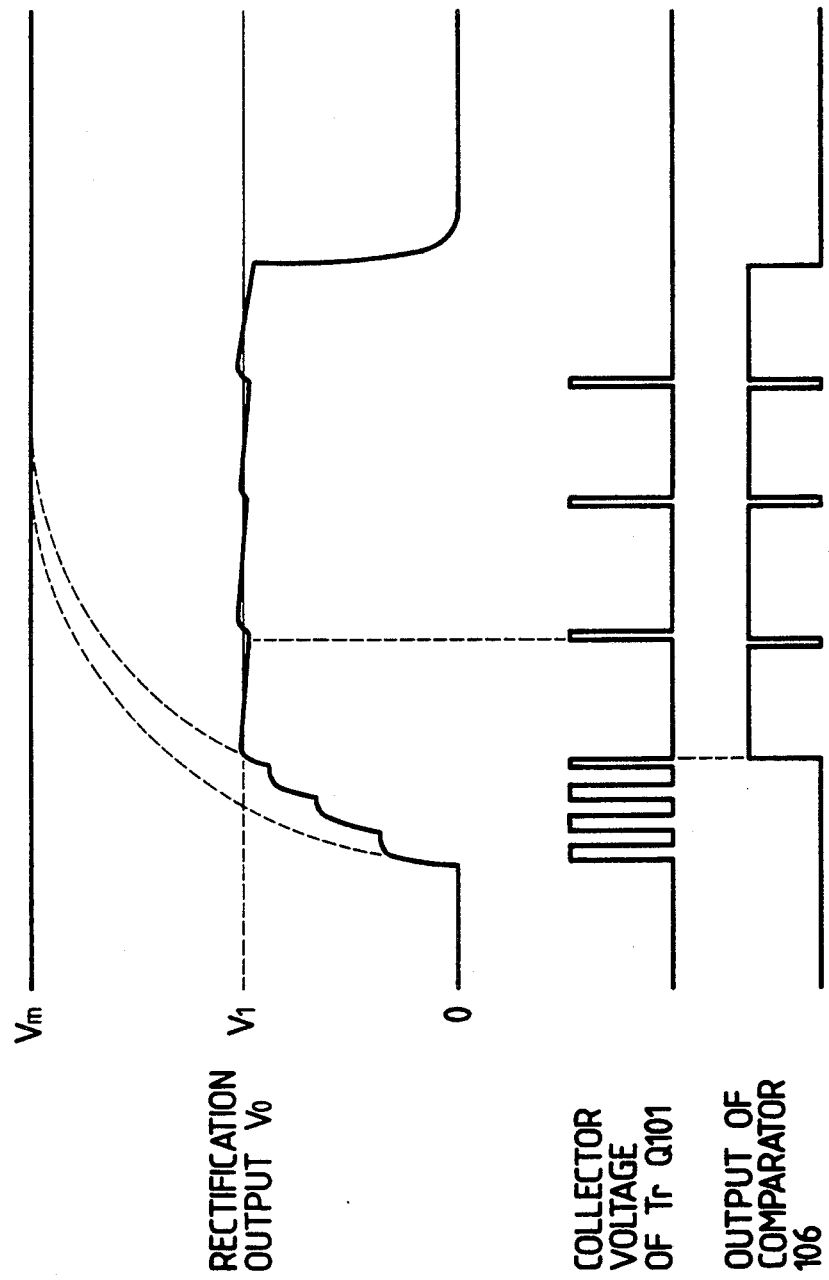
FIG. 32 is a waveform chart showing voltage waveforms appearing in various parts of the circuit shown in FIG. 31.

Further, with the electronic switch construction shown in FIG. 9, transistors Q31 and Q32 are active at all times, so that high response at the time when transistor Q2 is turned on can be obtained compared to the cases of FIGS. 27 and 28. At this time, transistor Q2 can be base-driven with respect to ground, and hence ordinary high-speed base driving techniques are applicable.

Where power is supplied from the circuit shown in FIG. 1 to, for instance, a developing roller of an electrophotographic apparatus, there is the following problem. The developing roller, which is connected to output terminal P1, is a capacitive load with most of the capacitance between it and the facing drum surface. Therefore, the rising of the output pulse is dull as shown in A and B in FIG. 30. FIG. 31 shows an embodiment, which is intended to solve this problem. More specifically, in this embodiment the load capacitance charging voltage, i.e., rectification output, is increased to increase the time constant of charging so as to permit quicker rising of the output, and the power supply to the primary side of the converter transformer is cut off when a predetermined output is reached by the output. FIG. 32 shows voltage waveforms appearing in various parts shown in FIG. 31. The rectification output V0 of converter transformer T101 is divided by voltage divider A consisting of resistors R141 and R142 to a predetermined ratio, and the division voltage is compared as a voltage, level detection value by comparator 106 with a predetermined reference voltage supplied to input terminal P2. When a predetermined value V1 is reached by the rectification voltage V0, the output of comparator 106 is inverted from low level to high level to turn on diode D141, thus turning on transistor Q103. As a result, the base potential on transistor Q101 is reduced to zero, thus turning off transistor Q101. Voltage divider A, comparator 106 and transistor Q103 constitute an output amplitude control circuit B.

The rising of the output Vo is greatly improved as shown in FIG. 32.

Shown at Vm in FIG. 32 is the saturation value of the rectification output V0. Capacitor C141 is constituted by the load capacitance, i.e., capacitance of the developing roller.

In order to reduce overshoot and ripple of the rectified output V0, comparator 106 should be operated at a sufficiently high speed.

Figure 33:
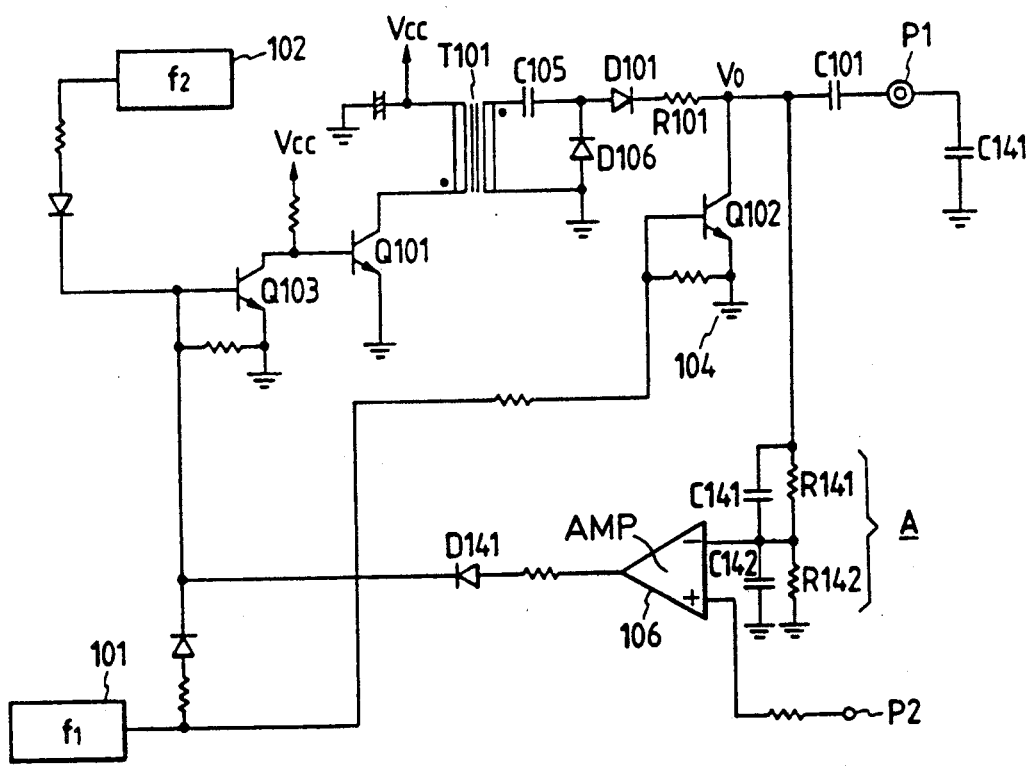
FIG. 33 is a diagram showing a further embodiment, which further comprises a phase compensation circuit added to the circuit shown in FIG. 31.

FIG. 33 shows a further embodiment. In this instance, capacitors C141 and C142 are connected as a phase compensation circuit across respective resistors R141 and R142 of voltage divider A, thus reducing delay time in voltage divider A to reduce overshoot and ripple.

Figure 34:
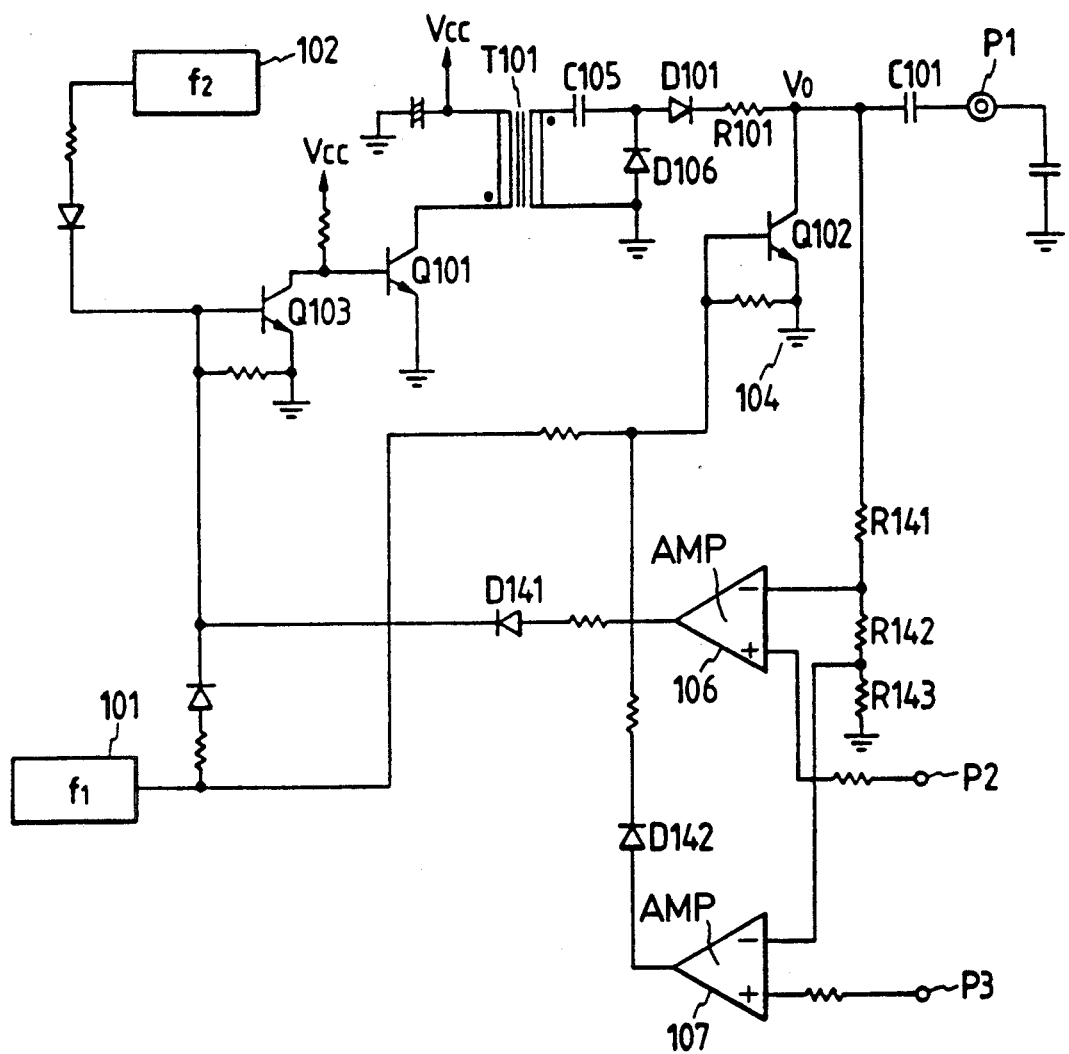
FIG. 34 is a diagram showing a further embodiment, in which a plurality of comparators are provided for output level detection.

FIG. 34 shows a still further embodiment. In this instance, a protective circuit is provided, in which when a preset level higher than the predetermined value V1 is reached by the rectification voltage V0 compared by separate comparator 107 from comparator 106 with the preset level, transistor Q102 is turned on to prevent a breakdown of transistor Q102 due to overvoltage or a leak between the developing roller and the facing drum surface due to application of overvoltage to the developing roller.

Figure 35:
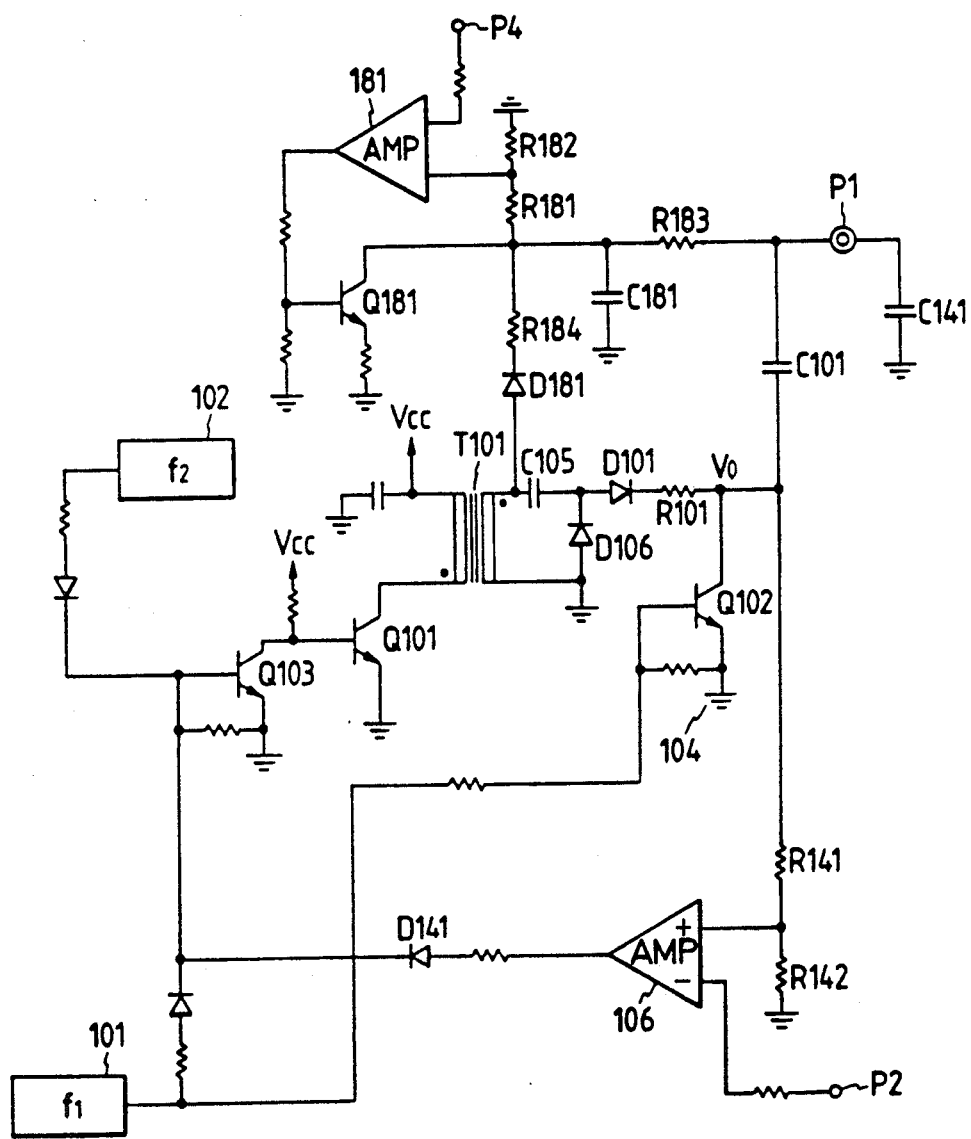
FIG. 35 is a diagram showing a further embodiment, in which an AC output of a converter transformer is on DC.

FIG. 35 shows yet a further embodiment. In this instance, a high DC voltage is superimposed on a high AC voltage of converter transformer T101.

More specifically, the secondary winding output of converter transformer T101 is rectified by high voltage diode D181 to obtain a DC for superimposition. Resistor R184, high breakdown voltage transistor Q181 and error amplifier 181 constitute a parallel voltage regulator. Capacitor C181 is a smoothing capacitor. The potential on the connection point between capacitor C181 and the collector of transistor Q181 is divided by resistors R181 and R182 to a predetermined ratio, and the obtained division voltage is compared by error amplifier 181 with a reference voltage applied to input terminal P4. Consequently, the collector current in transistor Q181 is controlled to hold a constant collector voltage of transistor Q181. The output voltage of this circuit is coupled by resistor R183 to the AC output to be applied to the developing roller.

With the above arrangement, the rising of the AC output is extremely improved, and also the efficiency of developement is increased, thus leading to density increase and density stabilization.

It is thus possible to protect the high breakdown voltage transistor and also protect the developing roller from application of overvoltage or the like with a high accuracy voltage limiter.

Figure 36:
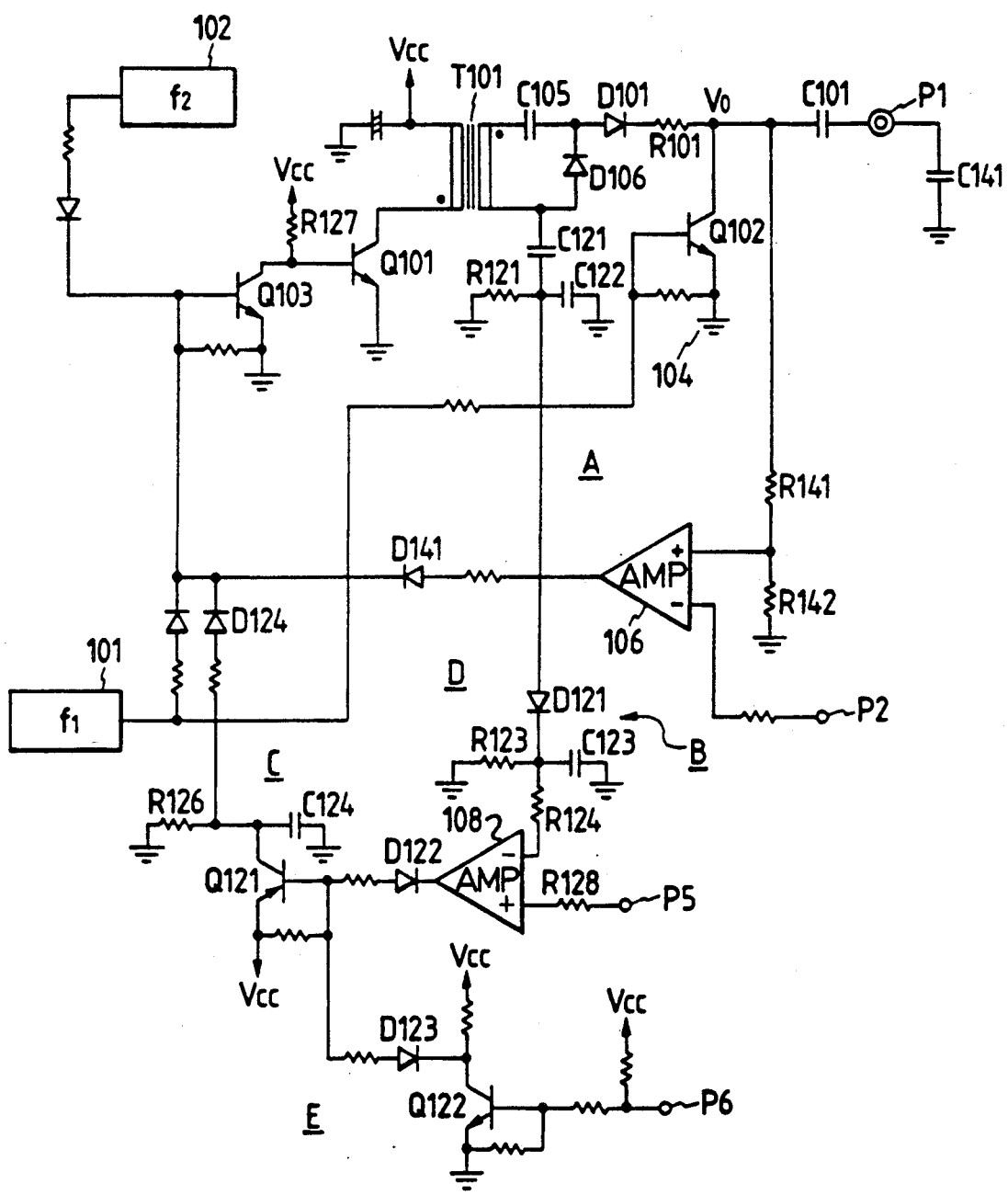
FIG. 36 is a diagram showing a further embodiment, which is provided with a constant voltage control circuit, a current limiter circuit and a soft start circuit.

FIG. 36 shows a further embodiment. In this instance, the rectification voltage V0 at a frequency of f2 from converter transformer T101 is divided by resistors R141 and R142 with a predetermined ratio, and the obtained division voltage is compared as voltage level detection value by high speed comparator 106 with a predetermined reference voltage applied to terminal P2. At this time, the voltage V0 is only directly divided, and therefore no delay time is involved. When the output of comparator 106 rises, diode D141 is turned on to turn on transistor Q103, thus turning off transistor Q101 to stop power supply to converter transformer T101. Resistors R141 and R142, comparator 106 and transistor Q103 constitute constant voltage control circuit A.

Meanwhile, the AC load current is detected by a circuit consisting of resistor R121 and capacitor C122 in parallel with each other on the secondary side of converter transformer T101. At this time, the DC component is blocked because of the provision of capacitor C121. Peak hold circuit B consisting of diode D121 and capacitor C123 is peak held by the detection output of the parallel circuit noted above. Resistor R123 is provided for providing a predetermined range of the hold time. The hold output is compared by comparator 108 with a predetermined reference voltage applied to terminal P5 and supplied through resistor R128. When the hold voltage exceeds the reference voltage, comparator 108 is switched from high level to low level. With the turning-on of diode D122 transistor Q121 is turned on, whereupon capacitor C124 constituting integrating circuit C is quickly charged. Thus, diode D121 and transistor Q103 are turned on and transistor Q101 is turned off, thus blocking the power supply to the primary side of converter transformer T101. At this time, the hold output on the cathode of diode D121 becomes lower than the reference voltage on terminal P5. Thus, when the high level output of comparator 108 is restored, power is not supplied to the primary side of converter transformer T101 for a predetermined period of time determined by the time constant of the circuit consisting of resistor R126 and capacitor C124 Integrating circuit C ANDs a sequence signal from terminal P6 with the output of converter 108 and constitutes a current limiter circuit D together with peak hold circuit B.

Further, a predetermined sequence signal (i.e., remote control signal) is supplied from a sequence controller (not shown) to terminal P6. This signal is "on" or at high level when the output is "off" and 0 V when the the output is "on" When signal at terminal P6 becomes "on", transistor Q122 is turned on as well as diode D123 and transistor Q121, causing current through diode D124 to turn on transistor Q103. Transistor Q101 is thus turned off to block the power supply to the primary side of converter transformer T101. When the potential on terminal P6 is switched from "on" to 0 V, transistor Q122, diode D123 and transistor Q121 are turned off. At this time, the collector potential on transistor Q121 goes from Vcc to 0 V in a fashion of a cyclic function. For this reason, current having previously been caused to flow through resistor R127 to transistor Q103 by the voltage Vcc gradually turns to flow into the base of transistor Q101. The rectification output V0 of converter transformer T1 is increased by soft start circuit E with the time constant of the circuit consisting of resistor R126 and capacitor C124.

Figure 37:
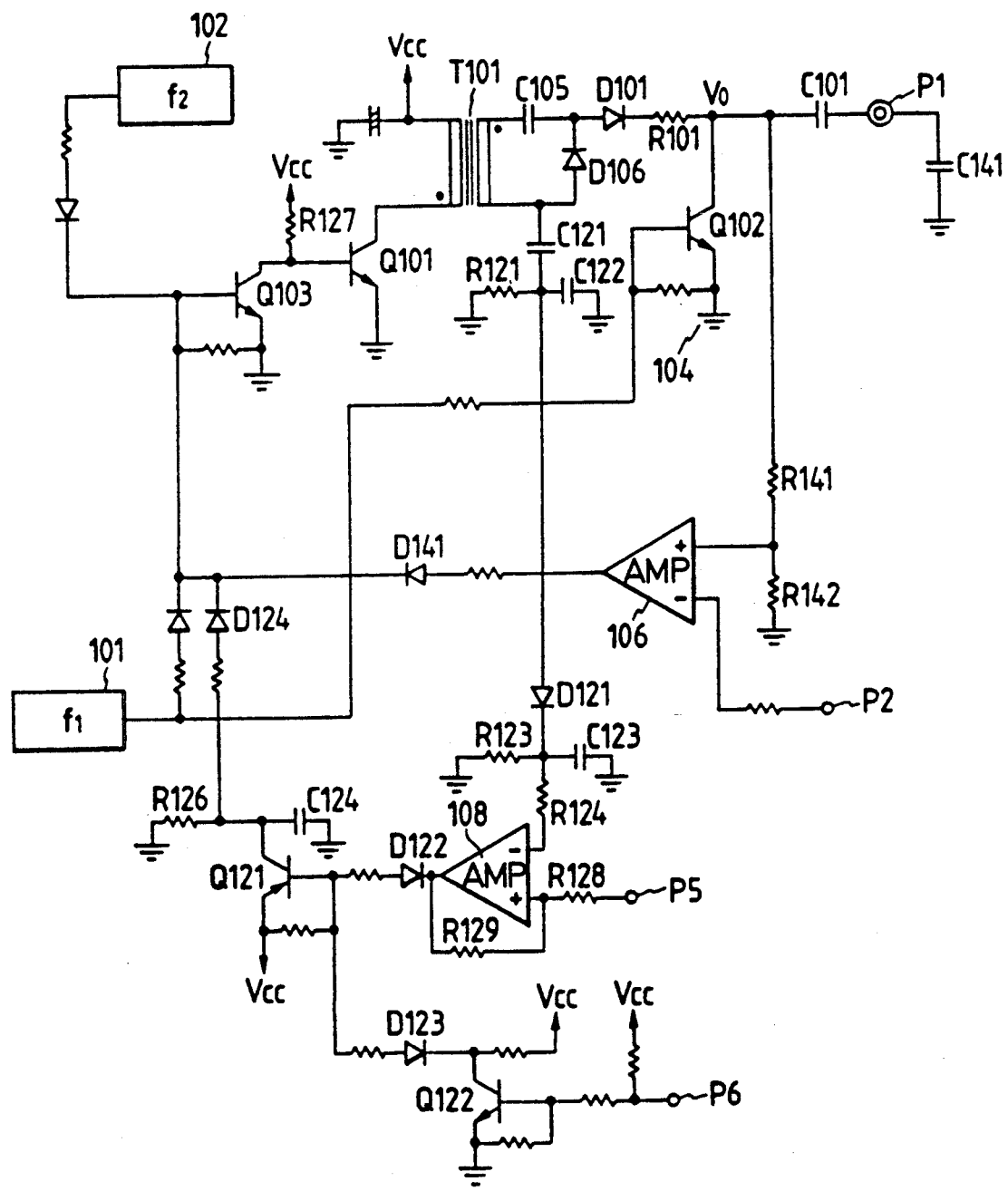
FIG. 37 is a diagram showing a further embodiment, in which a comparator in the circuit of FIG. 36 is provided with a hysteresis width.

FIG. 37 shows a further embodiment. In this instance, comparator 108 in the circuit of FIG. 36 is provided with a predetermined hysteresis width. This hysteresis width is determined by the ratio between the resistances of resistors R128 and R129. By increasing the hysteresis width, the ripple of the rectification output V0 is increased. However, it is necessary to set a minimum necessary hysteresis width for raising the collector voltage on transistor Q121 to the neighborhood of Vcc at the time of detection of an overcurrent.

Figure 38:
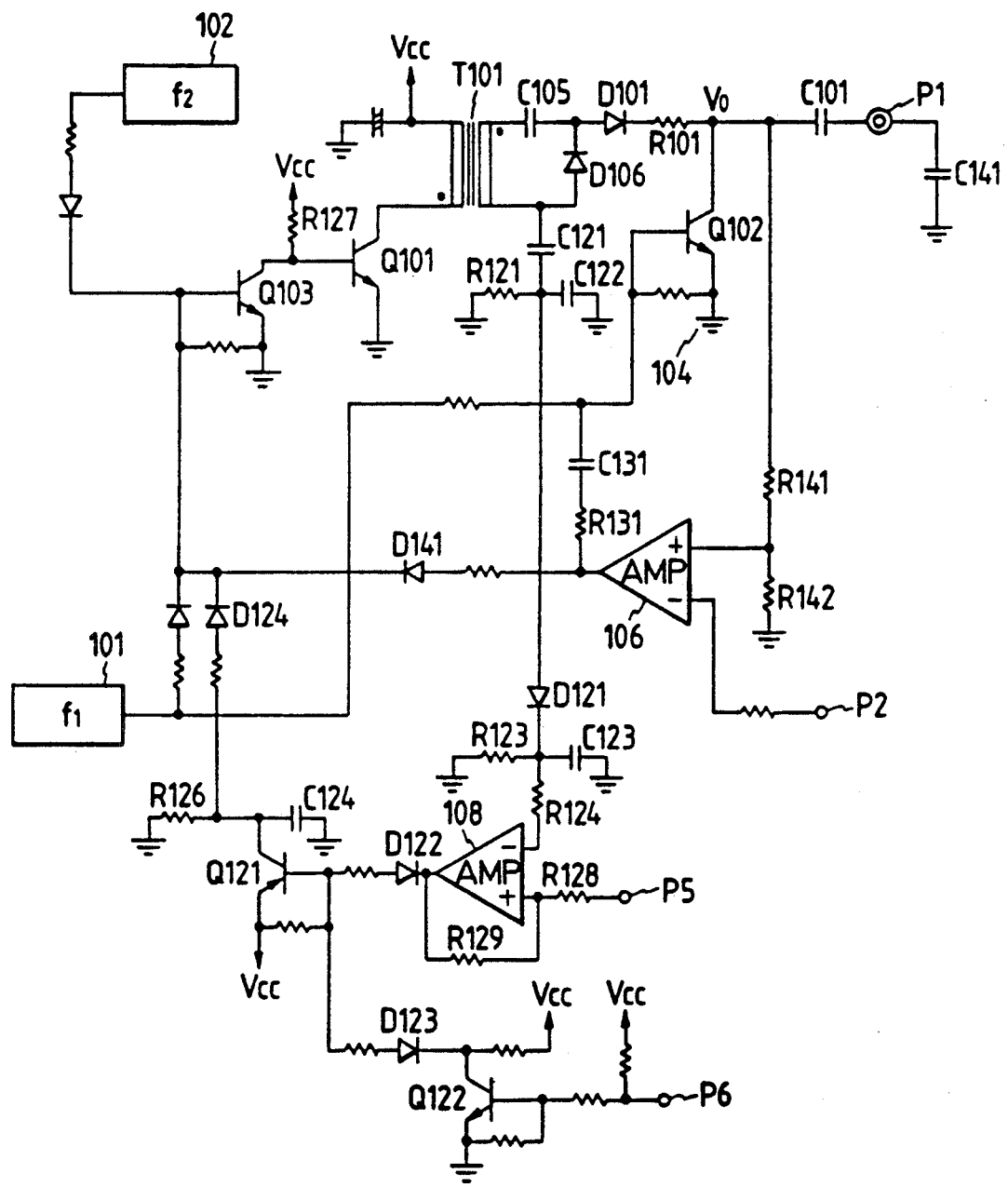
FIG. 38 is a diagram showing a further embodiment, which is adapted to absorb overshoot due to the time delay involved in amplitude control.

FIG. 38 shows a further embodiment. In this instance, transistor Q102 is held "on" for a very short period of the time from the rising of output of comparator 106, thus observing overshoot due to time delay involved in the amplitude control. In this case, the output side of comparator 106 is connected through capacitor C131 and resistor R131 in series therewith to the base of transistor Q102. The conduction time of transistor Q102 and the peak value of the collector current in transistor Q102 at this time are determined by the capacitance of capacitor C131 and resistance of resistor R131.

Figure 39:
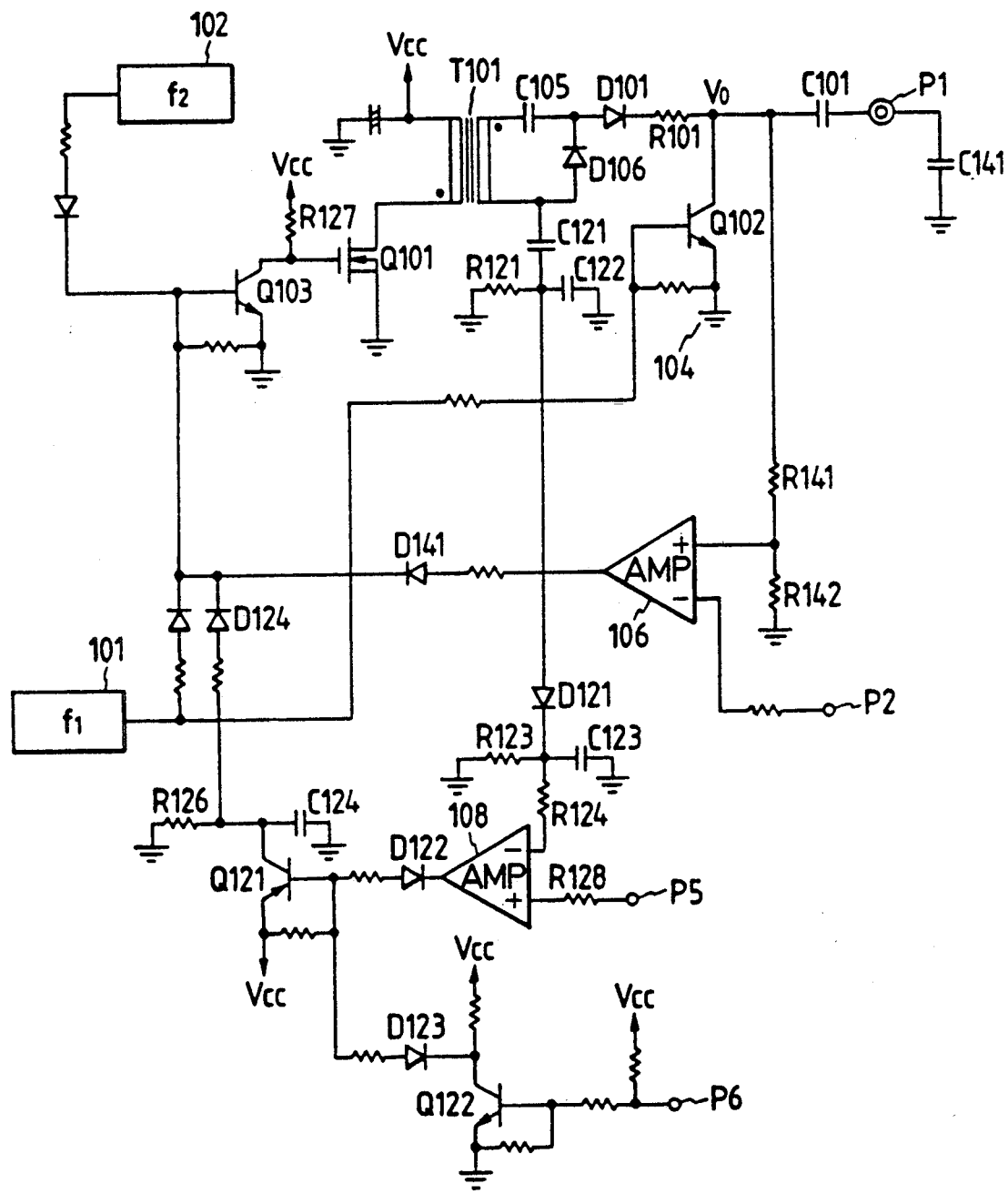
FIG. 39 is a diagram showing a further embodiment, which uses a VMOS FET as a switching transistor.

FIG. 39 shows a further embodiment. In this instance, a VMOS FET is used as a switching transistor Q101 for high speed driving of the converter transformer T101.

With the above arrangement, amplitude detection is obtained without rectification and smoothing of output pulse. Thus, very high speed amplitude control is possible to obtain an AC output with less overshoot, sag or ripple.

Further, the AC current in the load is directly detected, the detection output is peak held, the hold output is compared in the hysteresis comparator to a reference value, and the output of the comparator is coupled through a delay circuit also serving as a soft start circuit to switching transistor Q1 on the primary side of converter transformer T1. Thus, the power supply to converter transformer T1 can be blocked perfectly for a predetermined period of time only when a predetermined threshold value is exceeded by the load current. For this reason, there is no possibility of temperature rise or deterioration of individual elements at the time of the output short-circuit, and it is possible to construct a small size device at a low cost.

Further, since a soft start function is provided, there are no adverse effects on the developing system and latent image formation system of a copier or the like due to sudden potential changes. Further, there is no need of raising the current limiter threshold level lest the current limiter should be operated with an overcurrent at the time of start.

Further, to solve the problem of dulling of the output rising characteristic the charging voltage for the load capacitance, i.e. the saturation value of the rectification output, may be increased to obtain a quick rising of the output as noted before in connection with FIG. 29, and the power supply to the primary side of the converter transformer may be cut off and held "off" for a predetermined period of time when a predetermined level is reached by the output. By so doing, overshoot or ripple can be further reduced.

Figure 40:
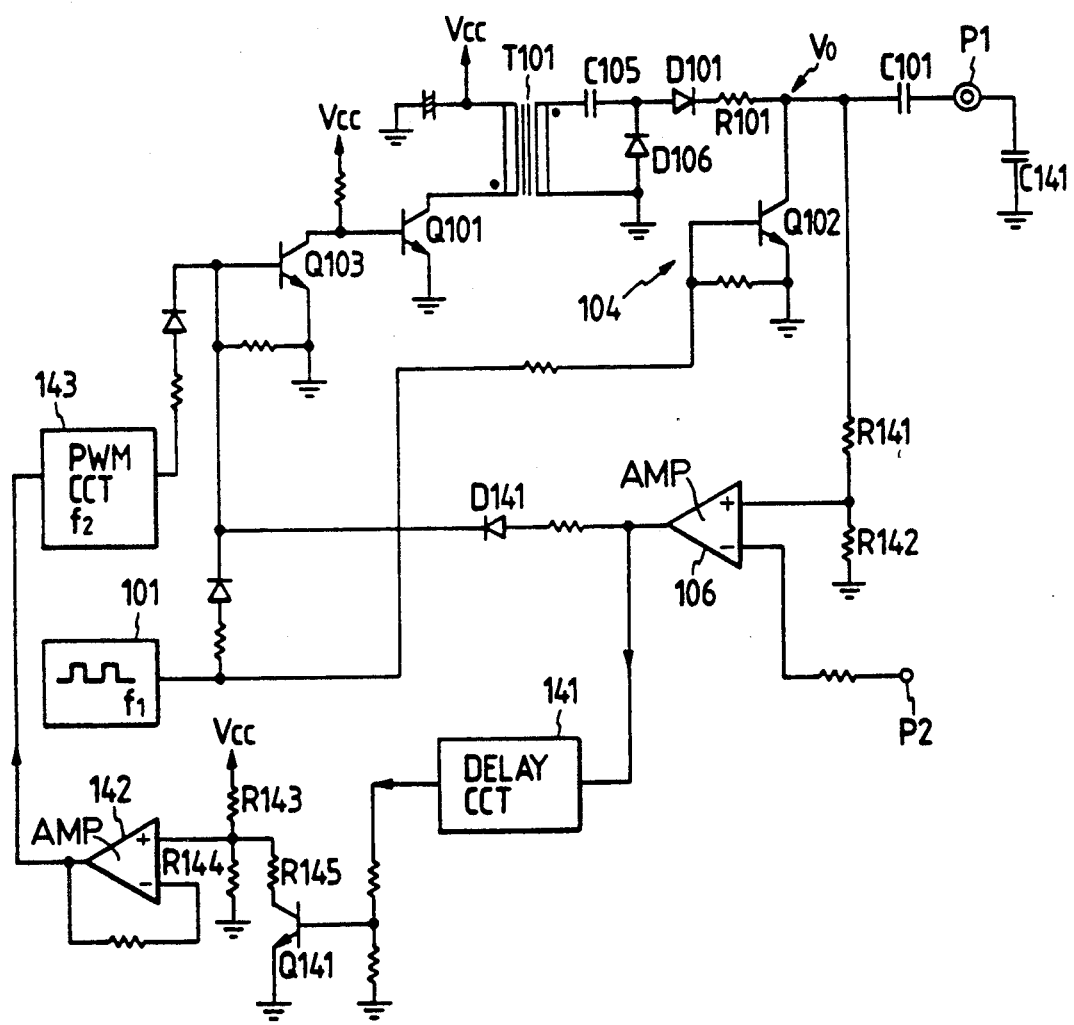
FIG. 40 is a diagram showing a further embodiment, in which the power supply to the primary side is held "off" for a predetermined period of time when a predetermined output level, is reached.
Figure 41:
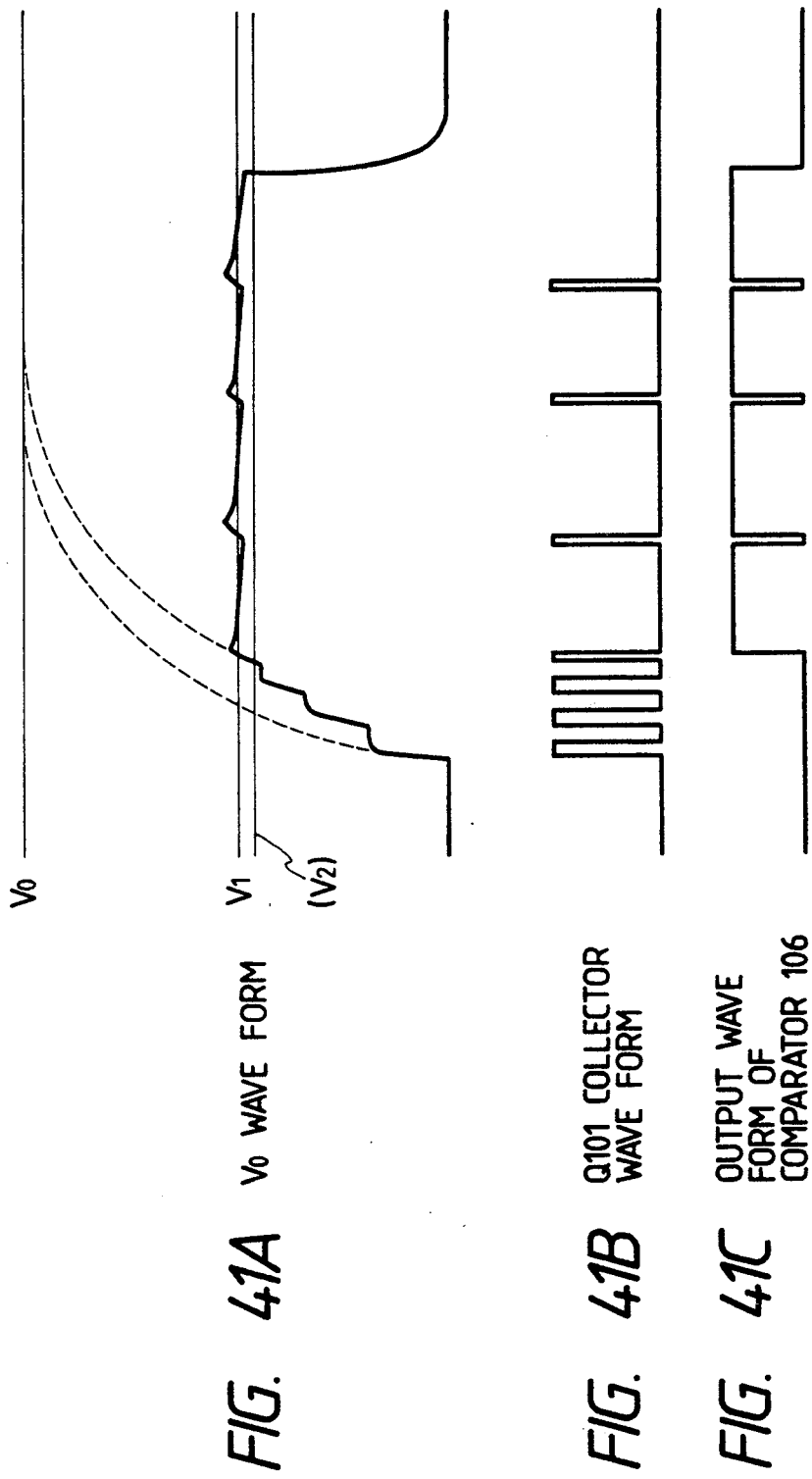
FIGS. 41A to 41C are waveform charts showing voltage waveforms appearing in various parts of the circuit of FIG. 40.

FIG. 40 shows a further embodiment, and FIG. 41 shows voltage waveforms appearing in various parts of this circuit.

This embodiment has a basic construction like that shown in FIG. 31. However, in this instance the converter transformer T101 is driven by PWM circuit 143, which is feedback controlled by the output of comparator 106. The output of PWM circuit 143 has a high repetition frequency f2 of 50 kHz and an amplitude to be a "large amplitude" such that the saturation value of rectification output V0 is sufficiently high compared to predetermined value V1 ("large amplitude" being used in this sense according to the invention).

Oscillator 101, like the case of FIG. 31, supplies a low frequency pulse wave at a repetition frequency f1 of 1,800 Hz and with a duty ratio of 20%. The large-ampitude high-frequency output of PWM circuit 143 is 100% pulse-modulated through the on-off operation of transistor Q103 with the pulse wave from oscillator 101, the modulation output being supplied to the base of transistor Q101 to drive the primary side of converter transformer T101. The reference voltage of comparator 106 is selected such that V0 has a predetermined value V1. Delay circuit 141 delays the output of comparator 106 by a predetermined time t1, which is longer than the high frequency cycle period of PWM circuit 143 but is sufficiently shorter than the low frequency cycle period of oscillator 101.

The rectification output V0 is divided by resistors R141 and R142 to a predetermined ratio, and the division voltage is supplied to comparator 106 for comparison to a reference voltage supplied to input terminal P2. Upon reaching of the predetermined value V1 by the rectification output V0 (see FIG. 40), the output of comparator 106 is inverted from low level to high level. As a result, diode D141 is turned on to turn on transistor Q103 and bring the base potential of transistor Q101 to zero. Transistor Q101 thus is turned off to stop the driving of converter transformer T101. When the rectification output V0 becomes lower than the predetermined value V1, the output of comparator 106 is inverted from high level to low level. As a result, the driving of converter transformer T101 by PWM circuit 143 is started. The driving of converter transformer T101 is stopped with the invertion of the output of comparator 106 caused with a rise of the rectification output V0. By the repetition of the above sequence of operations, the rectification output V0 is controlled to the predetermined value V1 Since the saturation value V0 is selected to be sufficiently higher than the predetermined value V1, the rising of the rectification output V0 is extremely improved as shown in A is FIG. 41. The response of comparator 106 should be sufficiently quick in order to reduce overshoot and ripple of the rectification output V0 Designated at C141 in FIG. 39 is the load capacitance, i.e., capacitance of the developing roller. The output of comparator 106 is also supplied through delay circuit 141 to transistor Q141 to turn on transistor Q141 after a predetermined delay time t1. When transistor Q141 is "off", voltage follower 142, which uses an operational amplifier, is $$Vcc \times \frac{R144}{R144 + R143} \quad (1)$$

This output is supplied to PWM circuit 143 to drive transistors Q103 and Q101 with a pulse width corresponding to the voltage given by formula (1). When transistor Q141 is turned off, the output of voltage follower 142 becomes $$Vcc \times \frac{R144}{R144 + R143(1 + R144/R145)} \quad (2)$$

In consequence, the pulse width of the output of PWM circuit 143 is reduced, and it remains to be such for a delay time t1 irrespective of the invention of the output of comparator 106. The speed of charging of load capacitance C141 is thus reduced to reduce output ripple (see FIG. 41). With the falling of the output, the pulse width of the output of PWM circuit 143 is increased after delay time t1. Thus, at the time of the next rising of output the amount of driving of (i.e., amount of power supplied to) the primary side of the converter transformer is increased. The output thus rises quickly.

Figure 42:
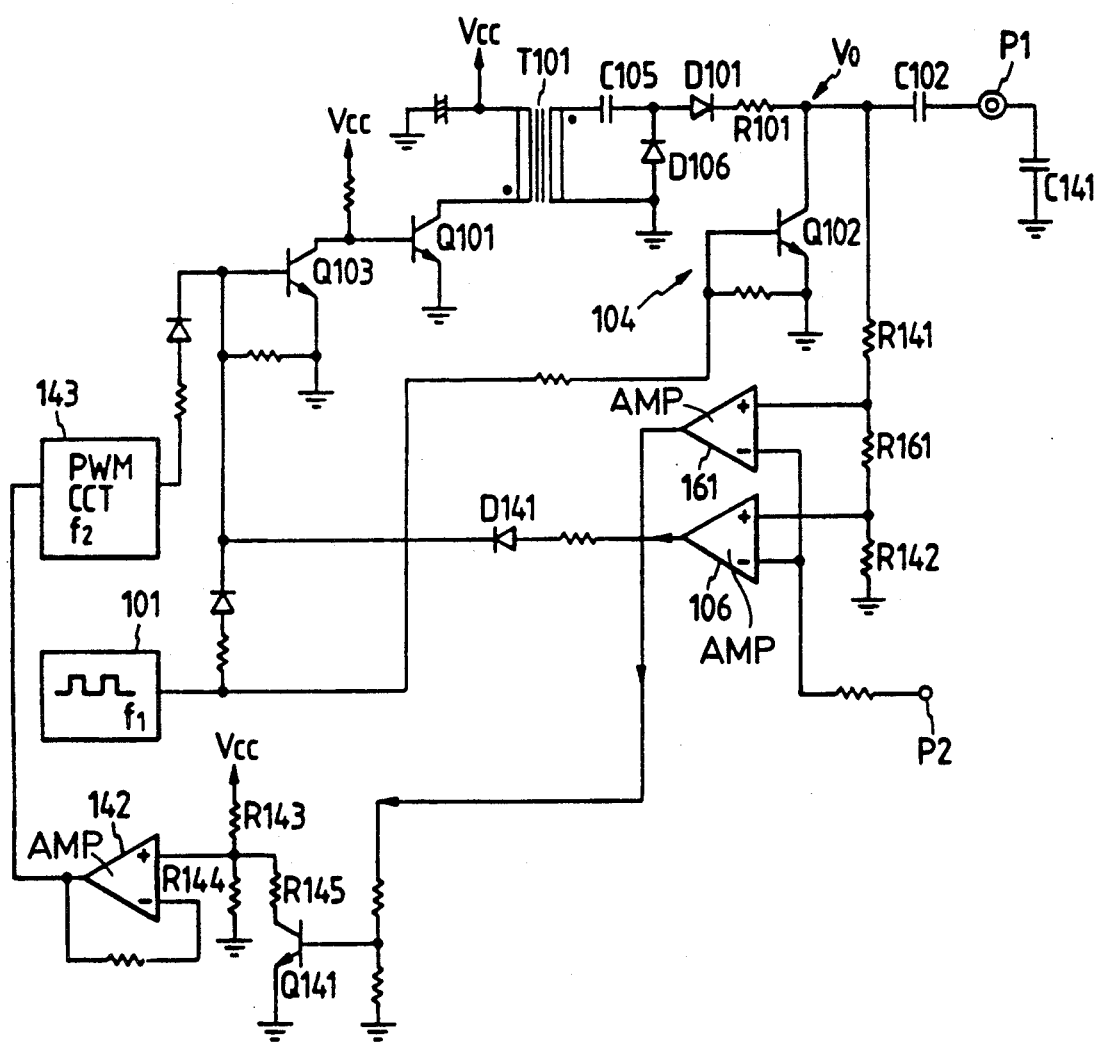
FIG. 42 is a diagram showing a further embodiment, which uses two comparators in lieu of the delay circuit shown in FIG. 40.

FIG. 42 shows a further embodiment In this instance, delay circuit 141 is not provided Instead, upon reaching of a level V2 (second predetermined value) right before the final level V1 (first predetermined value) by the rectification output V0, the amount of driving of (i.e., amount of power supplied to) the primary side of the converter transformer, thus reducing the speed of charging of C141 Comparator 106, like the embodiment shown in FIG. 39, completely cuts off the power supply to the primary side of converter transformer T101 by detecting the final level V1 Comparator 161 operates with a level V2 which is slightly lower than V1, that is, at level V1 it turns on transistor Q141 to reduce the driving amount of (i.e., amount of power supplied to) the converter transformer primary side and thus reduces the speed, of charging of C141.

Thus, after the reaching of the second predetermined value V2 by the rectification output V0, the charging speed is reduced to reduce overshoot of the rising of the output. While the output of comparator 106 is around the final level V1, the charging speed is low, and thus the ripple is reduced (see A in FIG. 41).

Figure 43:
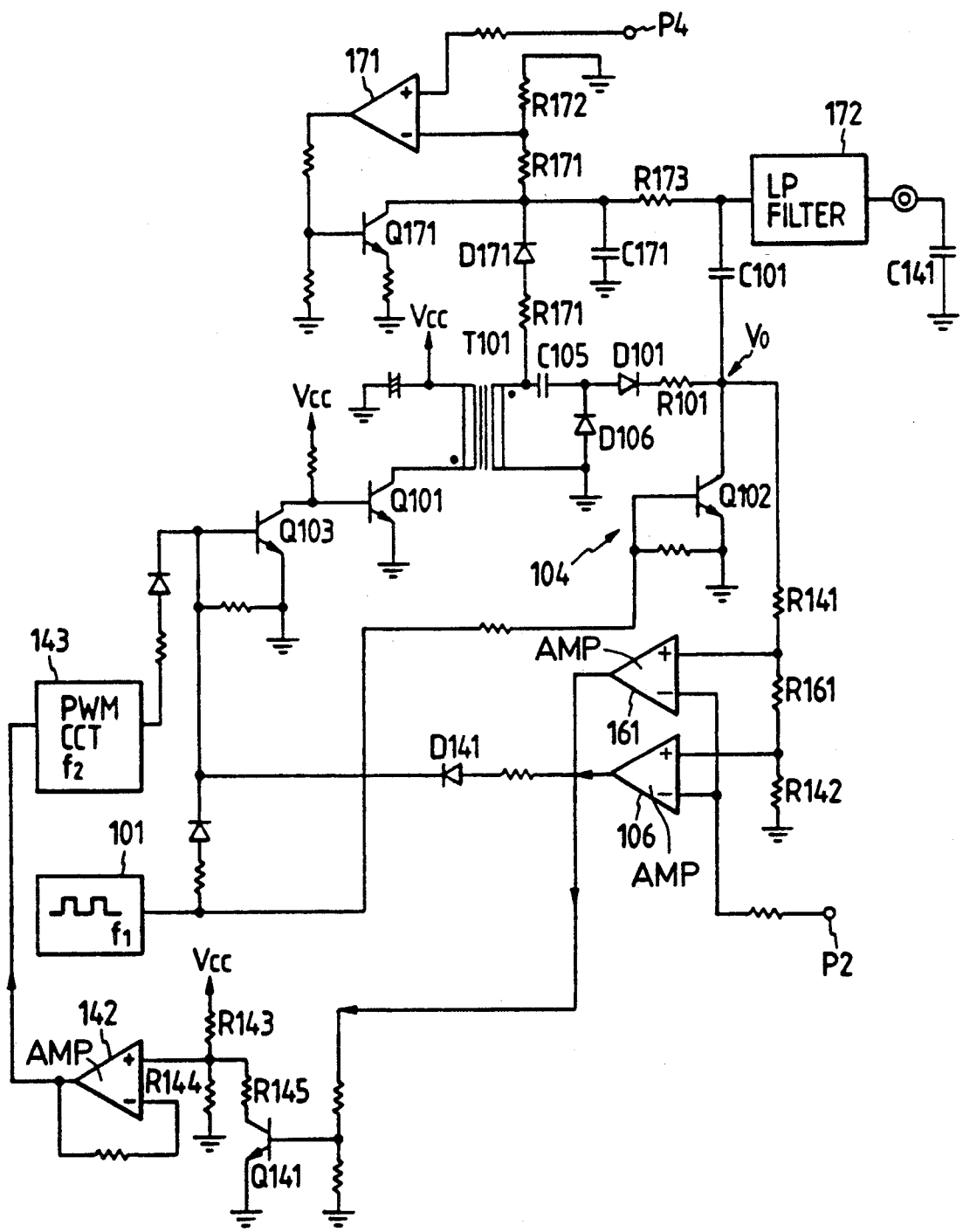
FIG. 43 is a diagram showing a modification of the circuit shown in FIG. 42.

FIG. 43 shows a further embodiment. In this instance, the rectification output V0 in the case of FIG. 42 is coupled through a DC superimposition circuit and low-pass filter 172 to a developing sleeve. Here, rectifying diode D171, smoothing capacitor C171, operational amplifier 171 and high breakdown voltage transistor Q171 constitute a DC bias circuit. The secondary side output of converter transformer T101 is also supplied through resistor R174 to the DC bias circuit. The AC output V0 is superimposed on the rectification output of diode D171, i.e., DC bias, by capacitor C101 and resistor R173. The superimposition output is supplied to a low-pass filter including inpedance element 172 and load capacitance C141 to remove high frequency ripple due to PWM circuit 143. As impedance element 172 may be a choke coil or resistor having a predetermined value. In this embodiment the amplitude-stabilized output is rectified to obtain a clamping power supply. Therefore, the clamping power supply itself is stabilized. It is thus possible to readily provide an output, which is stable both in amplitude and in DC level. As described above in the embodiment of FIG. 42, since the rectification output V0 has less overshoot and ripple, a high breakdown voltage transistor Q171 may have a low collector voltage rating.

With the above arrangement, the AC output rising speed can be extremely improved, which increases the developing efficiency and leads to density increase and density stabilization.

Further, the output amplitude can be stabilized with high accuracy.

Further, overshoot and ripple can be reduced.

I claim:

1. A power supply device comprising:
   a transformer including primary and secondary windings, for generating in said secondary winding a high voltage output corresponding to power supplied to said primary winding;
   first switching means for on-off switching power suppled to the primary winding of said transformer;
   first signal supply means for supplying a switching signal at a first frequency to said first switching means;
   rectifying means for rectifying the high voltage output generated in the secondary winding of said transformer;
   control means including second signal supply means for supplying a modulating signal at a second frequency lower than said first frequency, for modulating the output of said rectifying means by means of controlling the power supplied to the primary winding of said transformer in accordance with said modulating signal; and
   second switching means for setting the level of the output of said rectifying means to a predetermined voltage level in synchronism with said modulating signal.

2. The power supply device according to claim 1, wherein said control means modulates said rectifying means output by performing amplitude modulation of the switching signal from said first signal supply means according to the modulating signal from said second signal supply means.

3. The power supply device according to one of claims 1 and 2, wherein said second switching means sets the level of said rectifying means output to ground level.

4. The power supply device according to one of claims 1 and 2, wherein said first signal supply means provides a pulse signal at a high frequency.

5. The power supply device according to one of claims 1 and 2, wherein said second signal supply means supplies a pulse signal at a low frequency.

6. The power supply device according to one of claims 1 and 2, wherein said second switching means includes a high break-down voltage transistor.

7. A power supply device comprising:
   a transformer including primary and secondary windings for generating in said secondary winding a high voltage output corresponding to power supplied to said primary winding;
   first switching means for on-off switching power supplied to the primary winding of said transformer;
   first signal supply means for supplying a switching signal at a first frequency to said first switching means;
   rectifying means for rectifying the high voltage output generated in the secondary winding of said transformer;
   control means including second signal supply means for supplying a molulating signal at a second frequency lower than said first frequency, for modulating the output of said rectifying means by means of controlling the power supplied to the primary winding of said transformer in accordance with said modulating signal;
   second switching means for setting the level of the output of said rectifying means to a ground level in synchronism with said modulating signal; and
   a clamp circuit for clamping said rectifying means output to a predetermined level before said output is supplied to a load.

8. A power supply device comprising:
   a transformer including primary and secondary windings for generating in said secondary winding a high voltage output corresponding to power supplied to said primary winding;
   first switching means for on-off switching power supplied to the primary winding of said transformer;
   first signal supply means for supplying a switching signal at a first frequency to said first switching means;
   rectifying means for rectifying the high voltage output generated in the secondary winding of said transformer;
   control means including second signal supply means for supplying a modulating signal at a second frequency lower than said first frequency, for modulating the output of said rectifying means by means of controlling the power supplied to the primary winding of said transformer in accordance with said modulating signal;
   second switching means for setting the level of the output of said rectifying means to a predetermined voltage level in synchronism with said modulating signal; and
   stabilizing means for stabilizing the output of said rectifying means.

9. The power supply device according to claim 8, wherein said stabilizing means includes detecting means for detecting the output of said rectifying means and comparison control means for comparing the output of said detecting means with a reference value and controlling power supplied to the primary winding of said transformer in accordance with a result of the comparison.

10. The power supply device according to claim 9, wherein said comparison control means controls power supply voltage with respect to the primary winding of said transformer.

11. The power supply device according to claim 9, wherein said first signal supply means supplies said switching signal with a duty ratio variable in accordance with the input signal, and said comparison control means stabilizes said rectifying means output by means of varying the duty ratio of said switching signal in accordance with a result of said comparison.

12. The power supply device according to claim 8, wherein said stabilizing means includes detecting means for detecting the output of said rectifying means and comparison control means for comparing the output of said detecting means with a reference value and controlling the degree of conduction of said second switching means in accordance with a result of the comparison.

13. The power supply device according to claim 8, wherein said first signal supply means supplies a pulse signal, and said stabilizing means stabilizes said rectifying means output by controlling the number of pulses supplied from said first signal supply means to said first switching means.

14. The power supply device according to claim 13, wherein said stabilizing means includes detecting means for detecting said rectifying means output and comparing means for comparing signals corresponding to the output of said detecting means and a reference value with a predetermined pattern signal, said numer of pulses being controlled according to a result of said comparison.

15. The power supply device according to claim 8, wherein said stabilizing means includes detecting means for detecting the output of said rectifying means and comparing means for comparing signals corresponding to the output of said detecting means and a reference value with a predetermined pattern signal, the degree of conduction of said second switching means being controlled according to a result of said comparison.

16. The power supply device according to one of claims 8, 12, 14 and 15, wherein said reference value is provided from a digital computer through a digital-to-analog converting means.

17. A power supply device comprising:
a transformer including primary and secondary windings, for generating in said secondary winding a high voltage output corresponding to power supplied to said primary winding;
first switching means for on-off switching power supplied to the primary winding of said transformer;
rectifying means for rectifying the high voltage output generated in said secondary winding;
first signal supply means for supplying a sinusoidal signal at a predetermined frequency;
detecting means for detecting the output of said rectifying means;
second signal supply means for supplying a switching signal to said first switching means in accordance with the output of said detecting means and said sinusoidal signal from said first signal supply means;
second switching means for setting the level of said rectifying means output to a predetermined level; and
control means for controlling the conduction of said second switching means in accordance with the output of said detecting means and said sinusoidal signal from said first signal supply means 18. The power supply device according to claim 17, wherein said second signal supply means and said control means each include an error amplifier receiving the output of said detecting means and said sinusoidal signal.

19. The power supply device according to claim 18, wherein said error amplifier of said second signal supply means and said error amplifier of said control means have different ports, to which said detecting means output and sinusoidal signal are supplied 20. The power supply device according to claim 17, wherein said second switching means sets the level of said rectifying means output to a ground level.

21. The power supply device according to claim 18, which further comprises clamping means for clamping said rectifying means output to a predetermined potential.

22. The power supply device according to claim 17, which further comprises current detection means for detecting current flowing in a load receiving the output of said rectifying means, said control means further controlling the conduction of said second switching means in accordance with the output of said current detection means.

23. A power supply device comprising:
a transformer including primary and secondary windings, for generating in said secondary winding a high voltage output corresponding to power supplied to said primary winding;
first switching means for on-off switching power supplied to the primary winding of said transformr;
first signal supply means for supplying a switching signal at a first frequency to said first switching means;
rectifying means for rectifying the high voltage output generated in the secondary winding of said transformer;
control means including second signal supply means for supplying a modulating signal at a second frequency lower than said first frequency, for modulating the output of said rectifying means by means of controlling the power supplied to the primary winding of said transformer in accordance with said modulating signal; and
second switching means including a plurality of series-connected electronic elements, for setting said rectifying means output to a predetermined level in synchronism with said modulating signal 24. A power supply means for an electrophotographic apparatus for forming a visible image by charging a photosensitive medium, then exposing said medium to thereby form an electrostatic latent image thereon and then developing said electrostatic latent image, comprising:
a transformer including primary and secondary windings, for generating in said secondary winding a high voltage output corresponding to power supplied to said primary winding;
first switching means for on-off switching power supplied to the primary winding of said transformer;
first signal supply means for supplying a switching signal at a first frequency to said first switching means;
rectifying means for rectifying the high voltage output generated in the secondary winding of said transformer;
control means including second signal supply means for supplying a modulating signal at a second frequency lower than said first frequency, for modulating the output of said rectifying means by means of controlling the power supplied to the primary winding of said transformer in accordance with said modulating signal;
second switching means for providing a short circuit for shorting the level of the output of said rectifying means to a ground level in synchronism with said modulating signal; and
clamping means for providing the output of said rectifying means to a predetermined potential and providing said lamped rectifying means output as a developing bias voltage.

25. A power supply device comprising:
a transformer including primary and secondary windings, for generating in said secondary winding a high voltage output corresponding to power supplied to said primary winding;
first switching means for on-off switching power supplied to the primary winding of said transformer;
first signal supply means for supplying a switching signal at a first frequency to said first switching means;
rectifying means for rectifying the high voltage output generated in the secondary winding of said transformer;
control means including second signal supply means for supplying a modulating signal at a second frequency lower than said first frequency, for modulating the output of said rectifying means by means of controlling the power supplied to the primary winding of said transformer in accordance with said modulating signal;
second switching means for setting the level of the output of said rectifying means to a predetermined voltage level in synchronism with said modulating signal;
blocking means for detecting the output of said rectifying means and blocking current in the primary winding of said transformer when the detected value of said rectifying means output reaches the predetermined level; and
starting means for raising said rectifying means output in a fashion of a periodic function in accordance with a predetermined signal.

26. The power supply device according to claim 25, wherein said blocking means includes voltage detection means for detecting the voltage level of said rectifying means output and voltage control means for blocking current supply to said primary winding when the voltage level detected by said voltage detection means reaches the predetermined level.

27. The power supply device according to one of claims 25 or 26, wherein said blocking means includes current detection means for detecting current flowing in a load receiving said rectifying means output and current limiting means for blocking current supply to said primary winding for a predetermined period of time upon reaching of a predetermined level by the current level detected by said current detection means.

28. A power supply device, comprising: a transformer including primary and secondary windings, for generating in said secondary winding a high voltage output corresponding to power supplied to said primary winding;
first switching means for on-off switching power supplied to the primary winding of said transformer;
supply means for supplying a switching signal at a first frequency to said first switching means;
rectifying means for rectifying the high voltage output generated in secondary winding of said transformer;
control means including second signal supply means for supplying a modulating signal at a second frequency lower than said first frequency, for modulating the output of said rectifying means by means of controlling the power supplied to the primary winding of said transformer in accordance with said modulating signal;
second switching means for setting the level of the output of said rectifying means to a predetermined voltage level in synchromism with said modulating signal; and
second control means for detecting the output of said rectifying means and controlling the conduction of the primary winding of said transformer according to the detected rectifying means output value;
wherein said second control means reduces the degree of conduction of said primary winding when said detected value reaches a first level, and blocks current supply to said primary winding when said detected value reaches a second level.

* * * * *

UNITED STATES PATENT AND TRADEMARK OFFICE
CERTIFICATE OF CORRECTION

PATENT NO. : 5,173,847                               Page 1 of 5

DATED : December 22, 1992

INVENTOR(S) : Koji Suzuki

It is certified that error appears in the above-identified patent and that said Letters Patent is hereby corrected as shown below:

Drawing sheet 20, insert FIG. 26, as shown on the attached page, and delete FIG. 27.

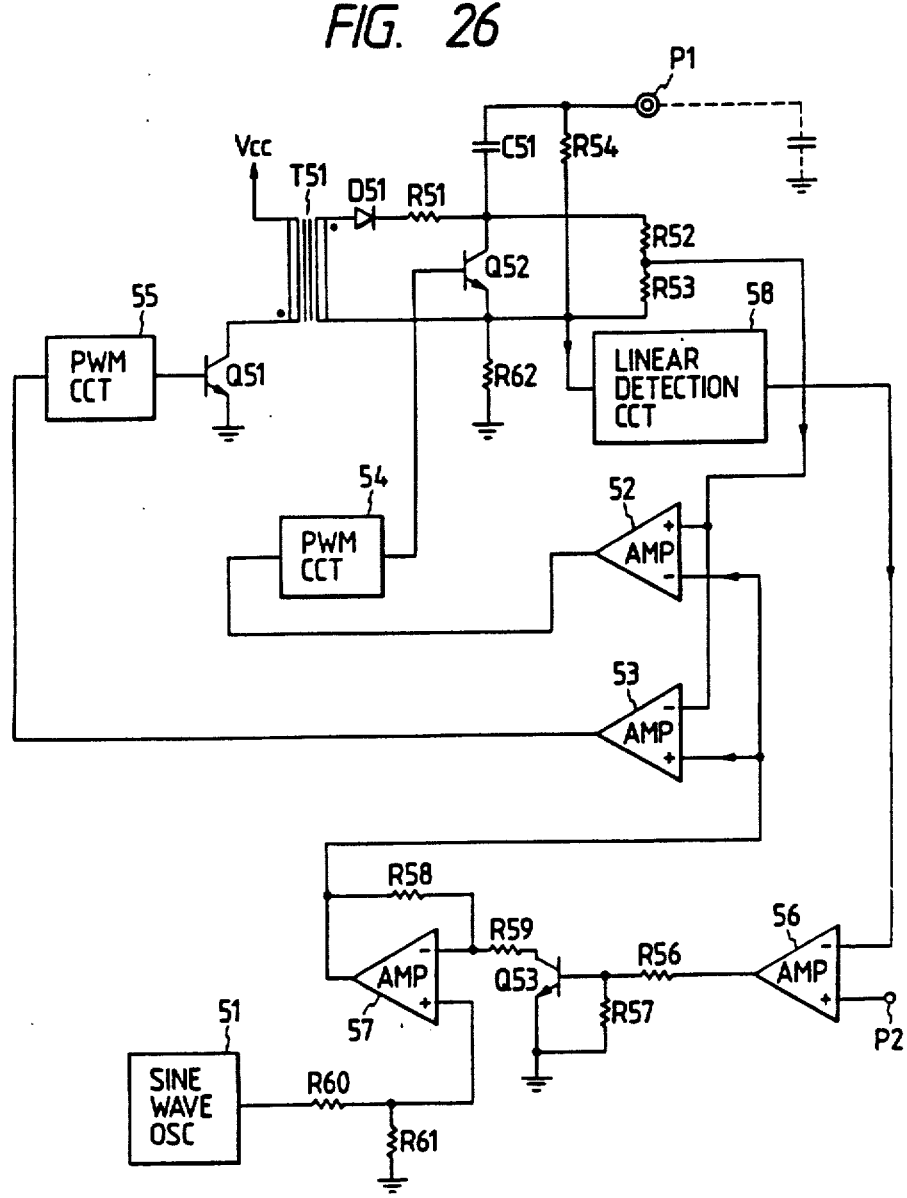

UNITED STATES PATENT AND TRADEMARK OFFICE
CERTIFICATE OF CORRECTION

PATENT NO. : 5,173,847

DATED : December 22, 1992

INVENTOR(S) : Koji SUZUKI

It is certified that error appears in the above-identified patent and that said Letters Patent is hereby corrected as shown below:

On the title page: Item

[30] Foreign Application Priority Data

Please add additional priority data, as follows:

```
--September 1, 1989  [JP]       1-224541
  September 1, 1989  [JP]       1-224544
  September 1, 1989  [JP]       1-224546
  September 1, 1989  [JP]       1-224547--
```

COLUMN 1:

line 20, "A" should read --An--.

COLUMN 6:

line 4, "oscillator" should read --oscillator 1--.

COLUMN 8:

line 67, "determined" should be deleted.

COLUMN 10:

line 66, "capacitance" should be deleted.

COLUMN 11:

line 10, "forcivly" should read --forcibly--;
line 12, "its" should read --its a--;
line 28, "/In" should read --In--.

UNITED STATES PATENT AND TRADEMARK OFFICE
CERTIFICATE OF CORRECTION

PATENT NO. : 5,173,847

DATED : December 22, 1992

INVENTOR(S) : Koji SUZUKI

It is certified that error appears in the above-identified patent and that said Letters Patent is hereby corrected as shown below:

COLUMN 14:

line 25, "voltage," should read --voltage--.

COLUMN 15:

line 50, "on" should read --on,--; and
    line 67, "on" should read --on.--.

COLUMN 16:

line 67, "characteristic" should read
      --characteristic,--.

COLUMN 17:

line 56, "V1" should read --$V_1$.--.

COLUMN 18:

line 25, "embodiment" should read --embodiment.--;
    line 26, "provided" should read --provided.--;
    line 32, "C141" should read --C141.--; and
    line 35, "V1" should read --$V_1$.--.

COLUMN 19:

line 18, "suppled" should read --supplied--.

UNITED STATES PATENT AND TRADEMARK OFFICE
CERTIFICATE OF CORRECTION

PATENT NO. : 5,173,847
DATED      : December 22, 1992
INVENTOR(S) : Koji SUZUKI

It is certified that error appears in the above-identified patent and that said Letters Patent is hereby corrected as shown below:

<u>COLUMN 21</u>:

line 55, "means" should read --means.--; and
   line 65, "supplied" should read --supplied.--.

<u>COLUMN 22</u>:

line 36, "signal" should read --signal.--.

<u>COLUMN 24</u>:

line 9, "comprising: a trans-" should read
     --comprising: ¶ a trans- --; and
   line 17, "supply means" should read --first
     signal supply means--.

Signed and Sealed this

Eighteenth Day of January, 1994

Attest:

BRUCE LEHMAN

Attesting Officer     Commissioner of Patents and Trademarks